Aug. 11, 1953     M. P. NEAL     2,648,450
CARTON UNLOADING AND UNIT UNSCRAMBLING MACHINE
Filed April 28, 1949     14 Sheets-Sheet 1
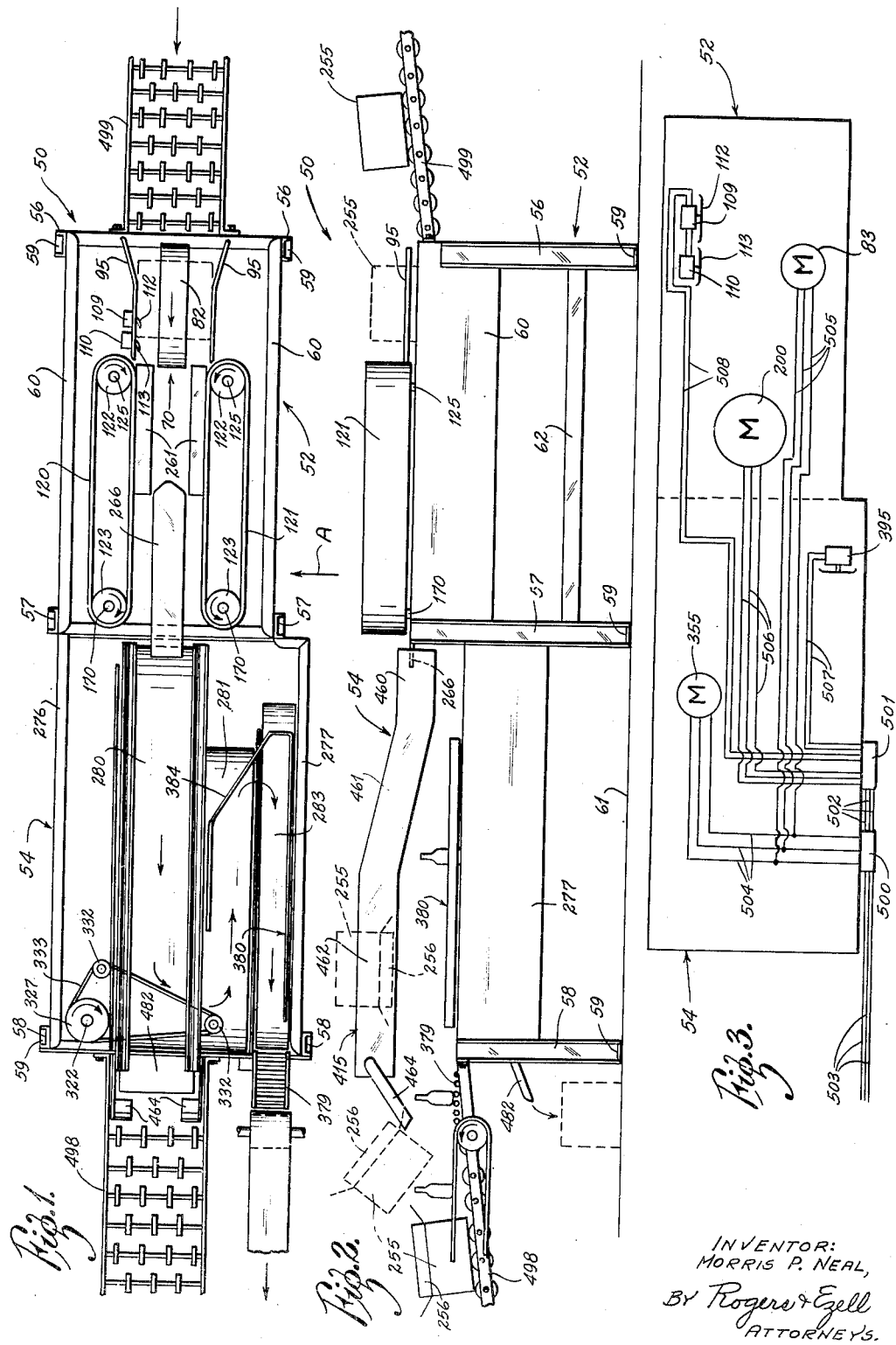
INVENTOR:
MORRIS P. NEAL,
BY Rogers & Ezell
ATTORNEYS.

Aug. 11, 1953         M. P. NEAL         2,648,450
CARTON UNLOADING AND UNIT UNSCRAMBLING MACHINE
Filed April 28, 1949                     14 Sheets-Sheet 2
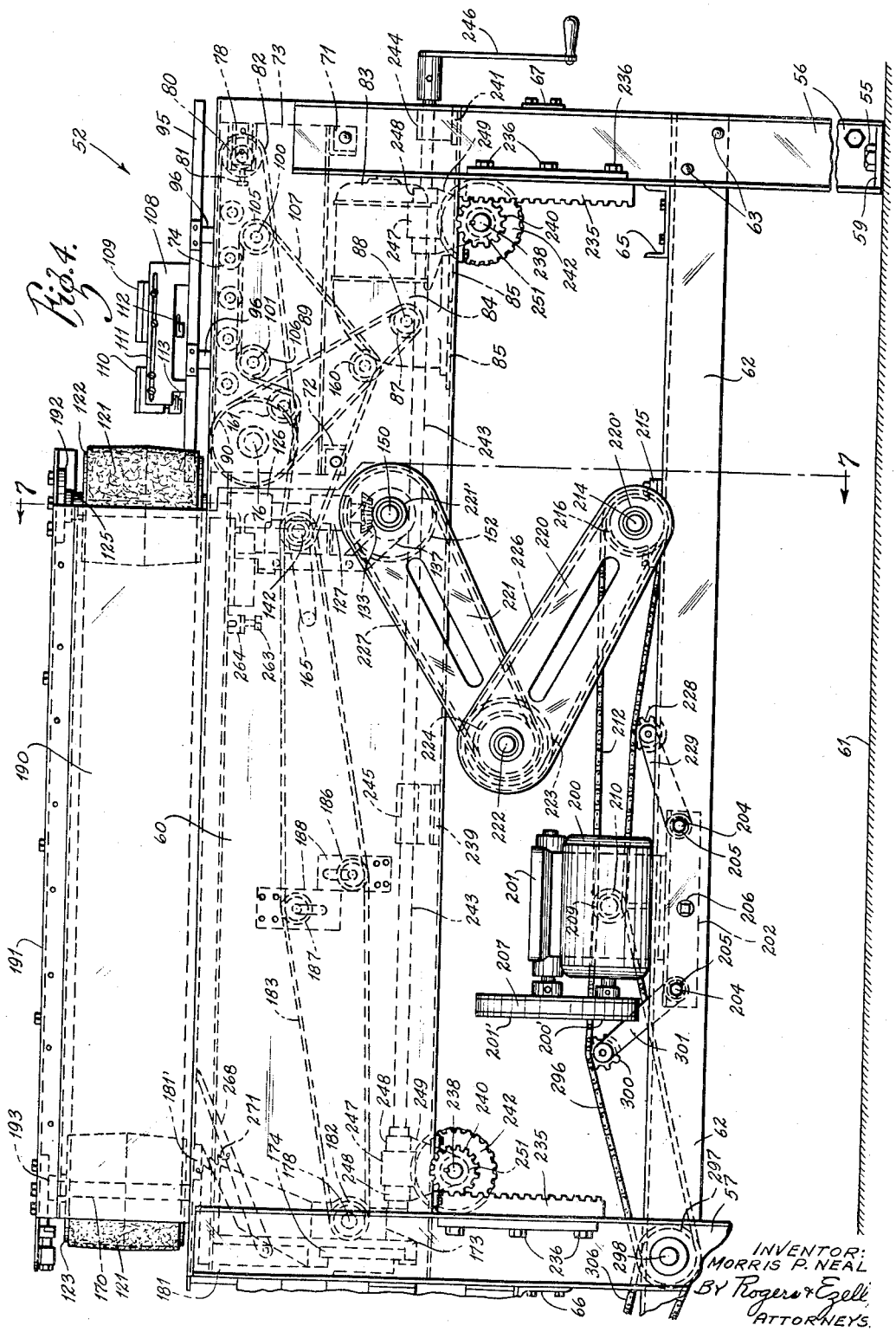
INVENTOR:
MORRIS P. NEAL
BY Rogers & Ezell
ATTORNEYS

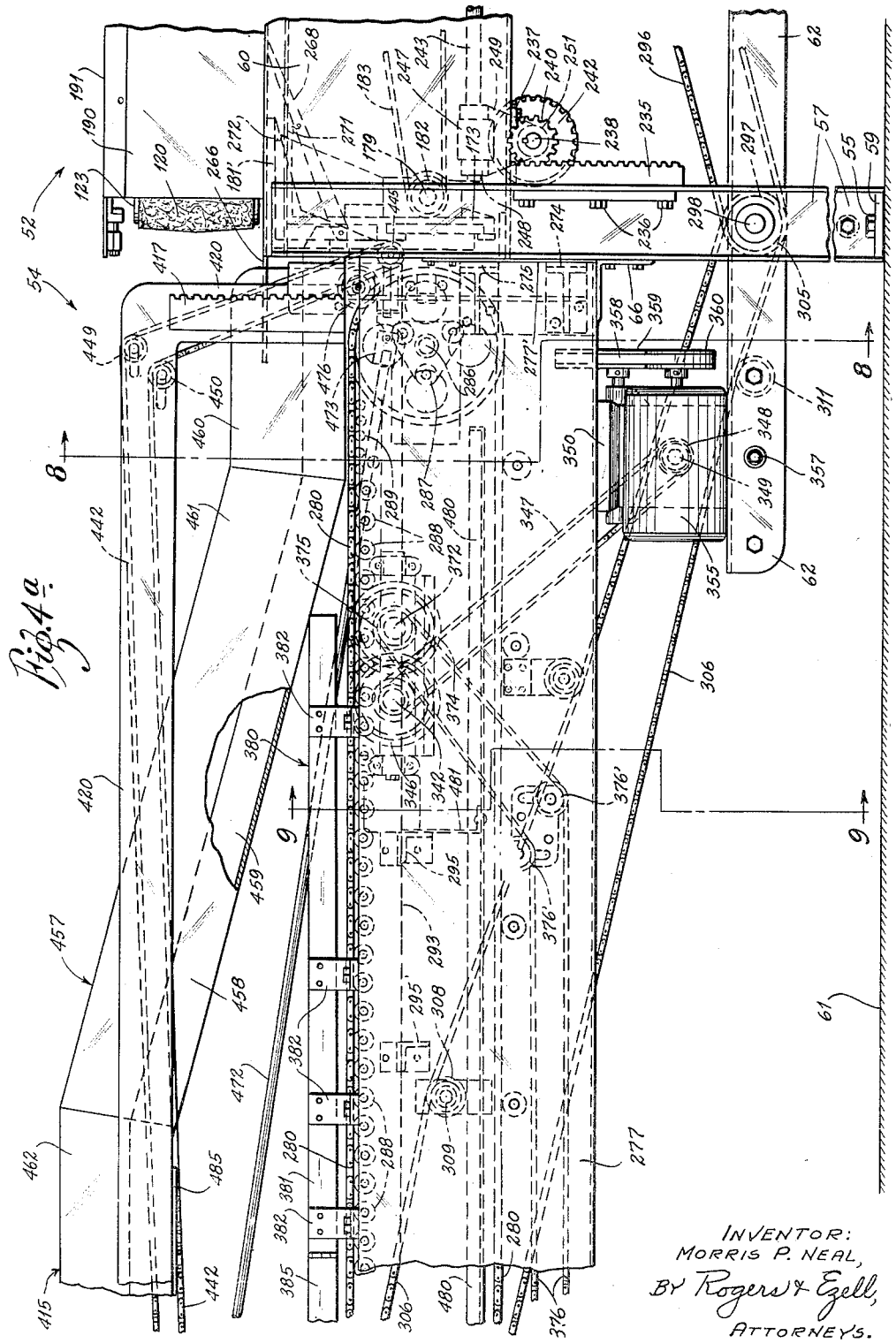

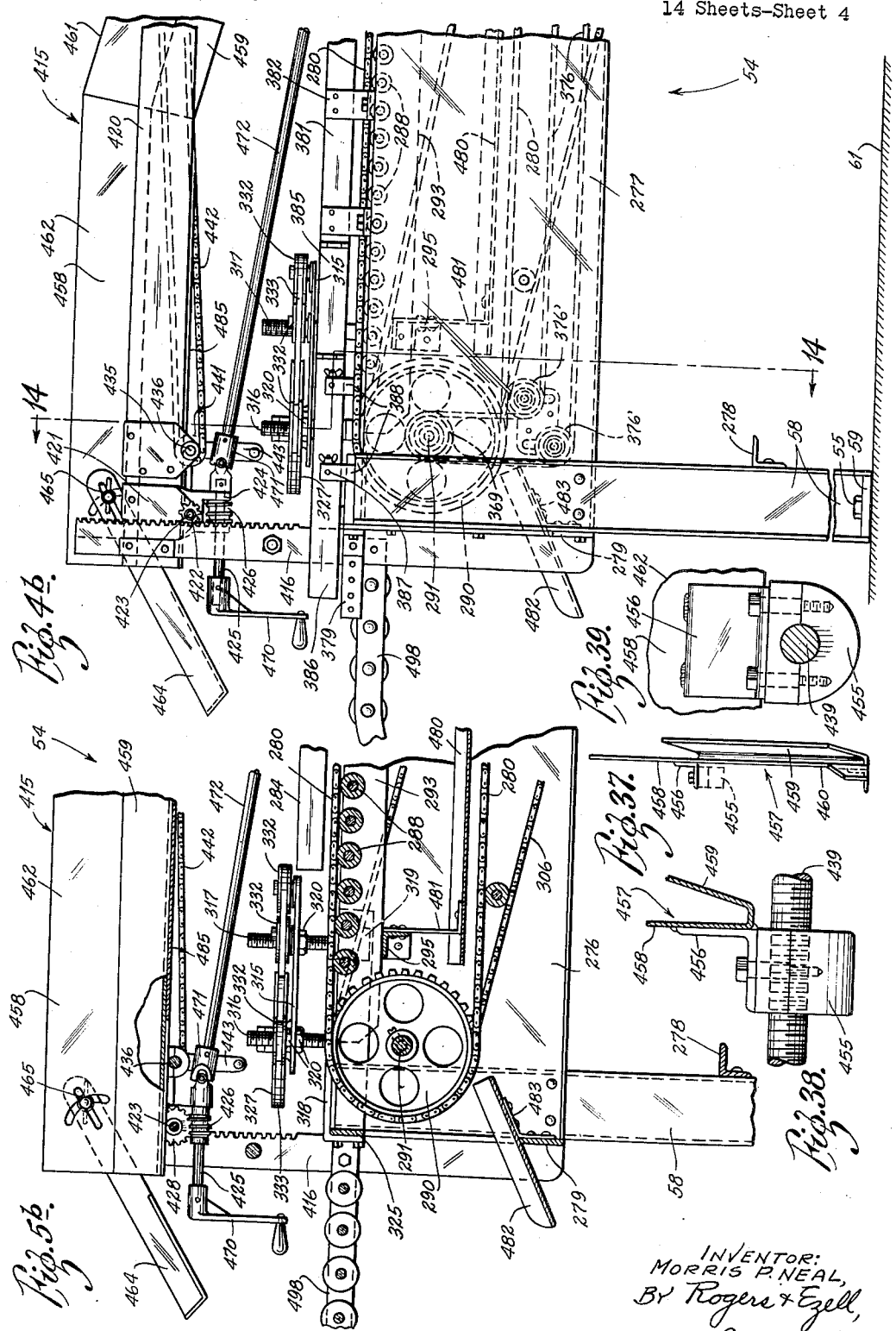

Aug. 11, 1953　　　　　M. P. NEAL　　　　　2,648,450
CARTON UNLOADING AND UNIT UNSCRAMBLING MACHINE
Filed April 28, 1949　　　　　　　　　　　　　　14 Sheets-Sheet 5
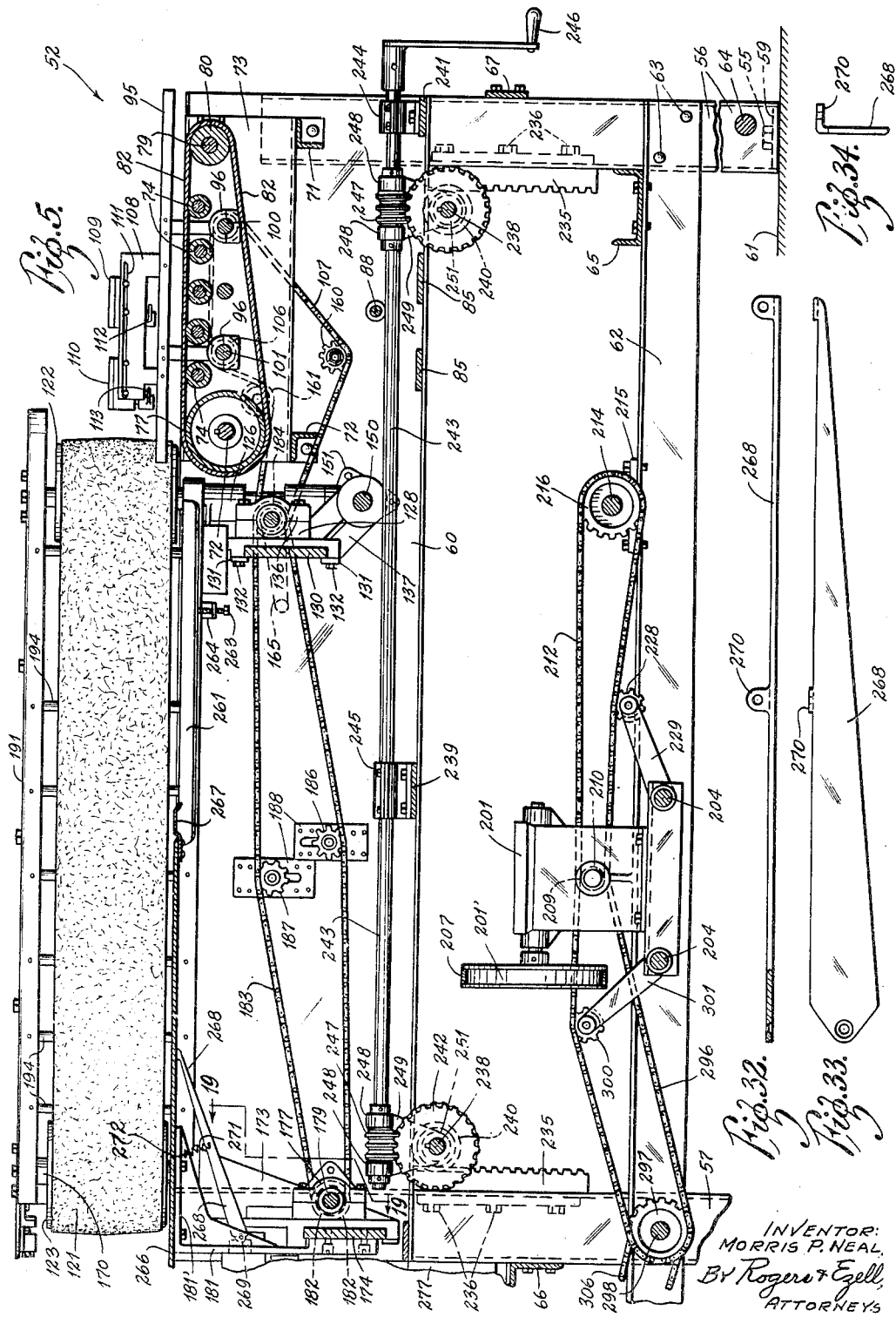
INVENTOR:
MORRIS P. NEAL.
By Rogers & Ezell,
ATTORNEYS Aug. 11, 1953 M. P. NEAL 2,648,450
CARTON UNLOADING AND UNIT UNSCRAMBLING MACHINE
Filed April 28, 1949 14 Sheets-Sheet 6
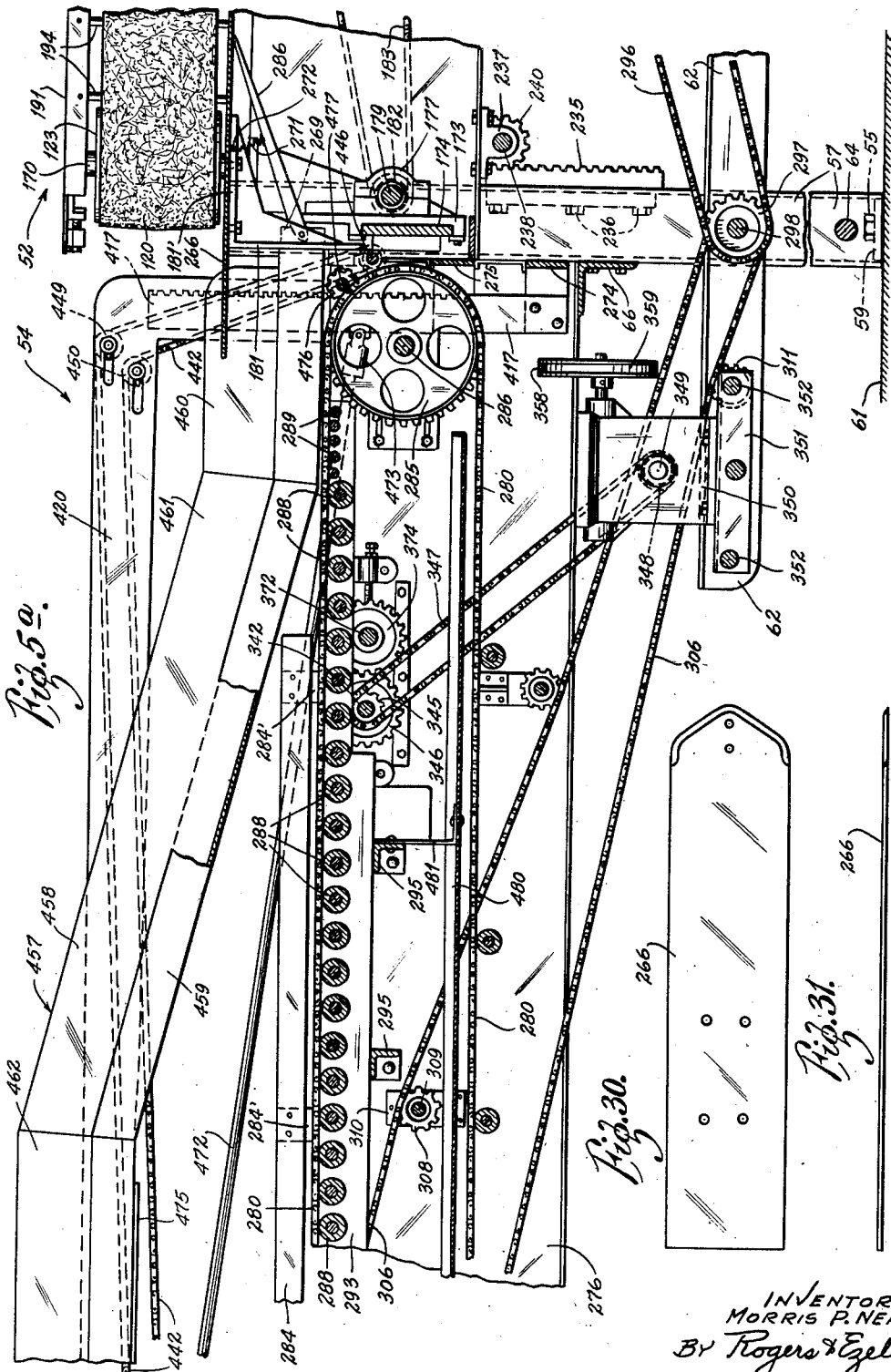
INVENTOR:
MORRIS P. NEAL,
BY Rogers & Ezell,
ATTORNEYS.

Aug. 11, 1953          M. P. NEAL          2,648,450
CARTON UNLOADING AND UNIT UNSCRAMBLING MACHINE
Filed April 28, 1949                              14 Sheets-Sheet 7
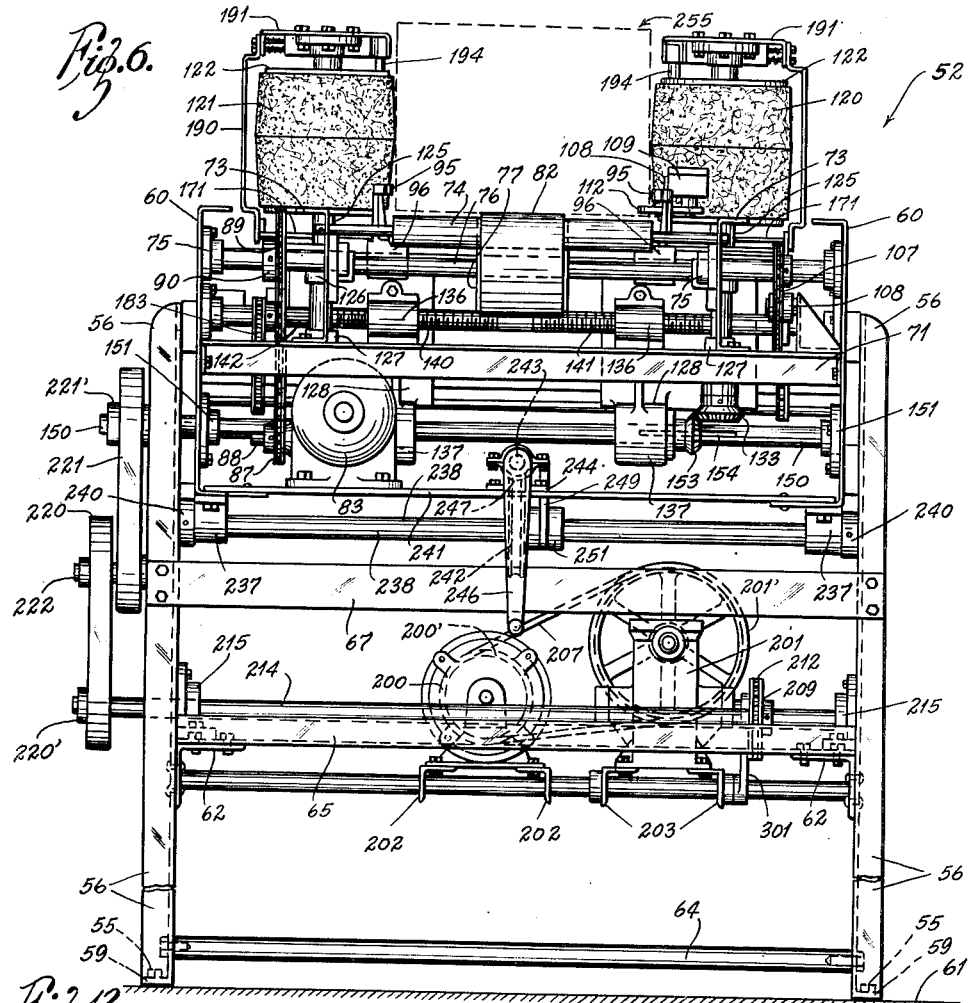
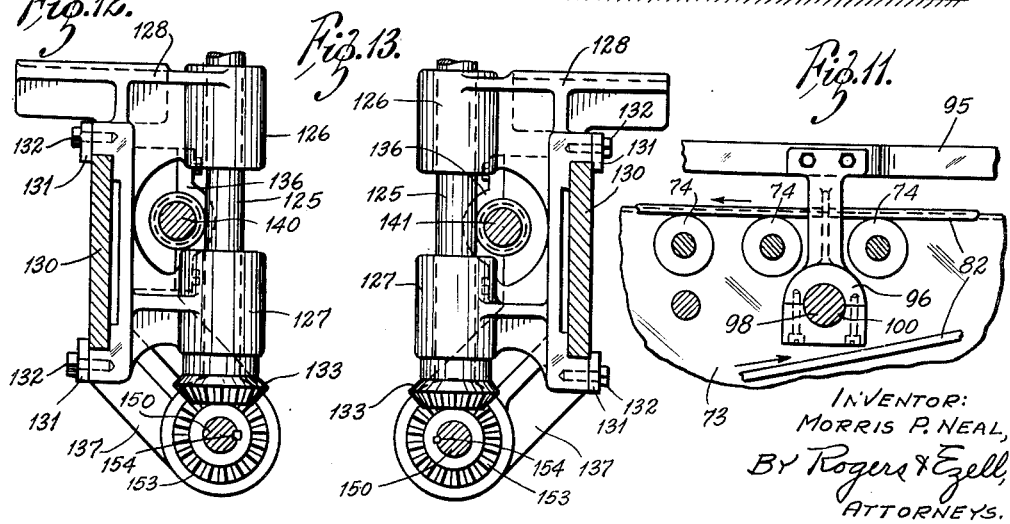
INVENTOR:
MORRIS P. NEAL,
BY Rogers & Ezell,
ATTORNEYS.

Aug. 11, 1953
M. P. NEAL
2,648,450
CARTON UNLOADING AND UNIT UNSCRAMBLING MACHINE
Filed April 28, 1949
14 Sheets-Sheet 8
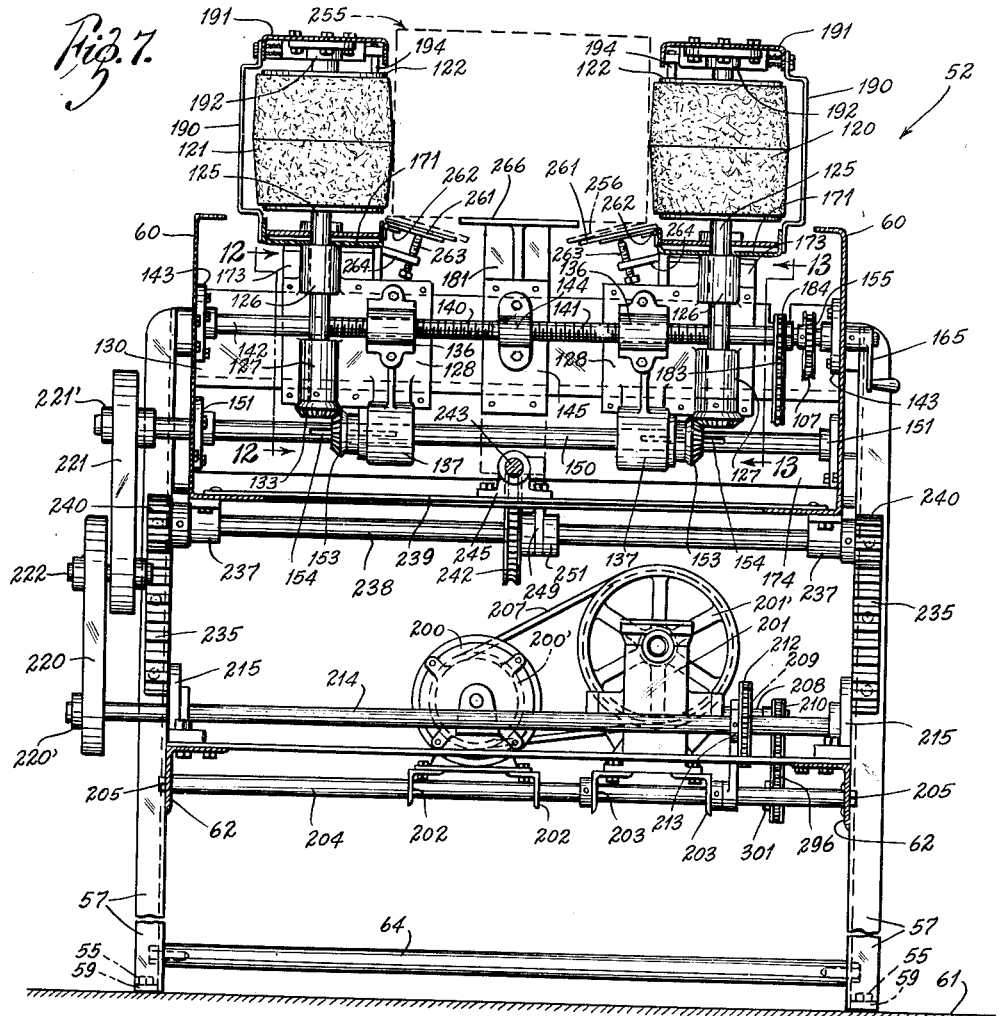
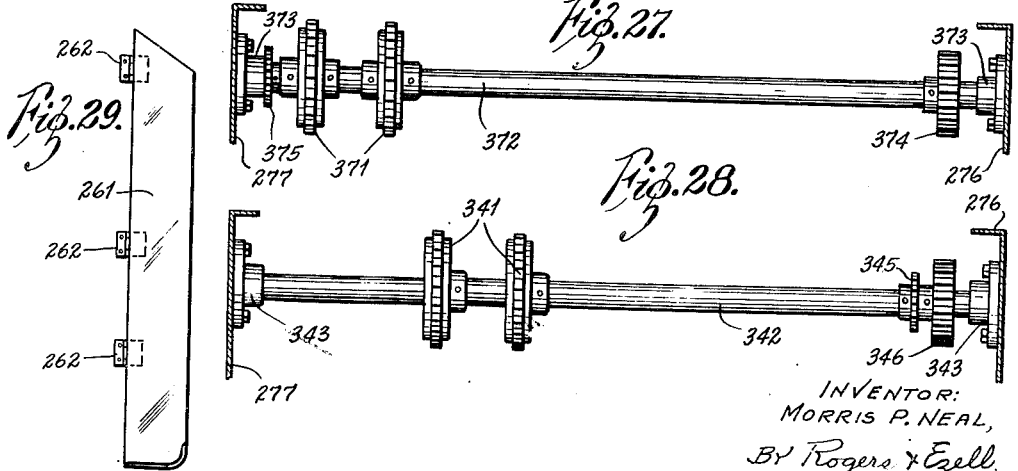
INVENTOR:
MORRIS P. NEAL,
BY Rogers & Ezell,
ATTORNEYS.

Aug. 11, 1953  M. P. NEAL  2,648,450
CARTON UNLOADING AND UNIT UNSCRAMBLING MACHINE
Filed April 28, 1949  14 Sheets-Sheet 9
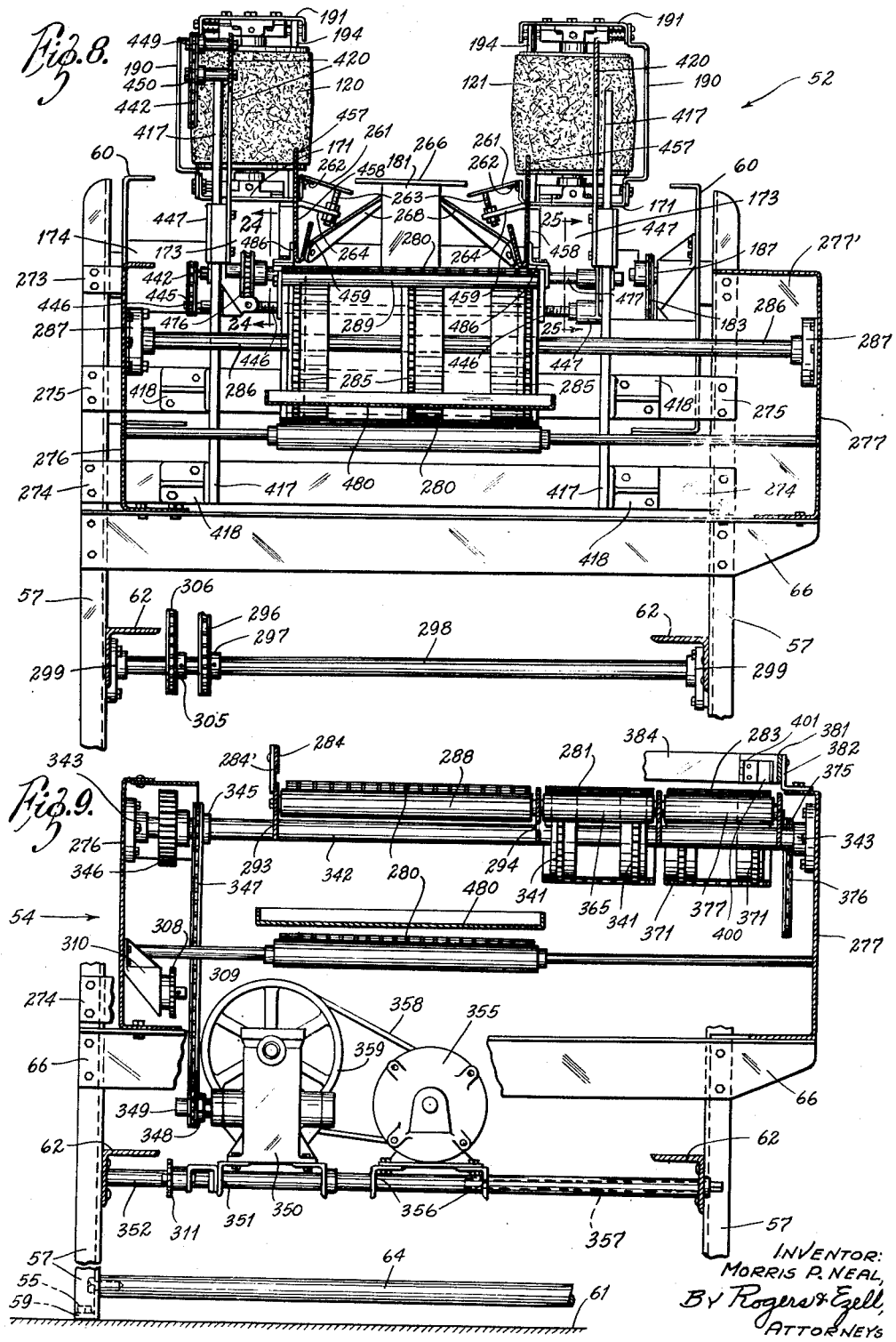
INVENTOR:
MORRIS P. NEAL,
By Rogers & Ezell,
ATTORNEYS Aug. 11, 1953 M. P. NEAL 2,648,450
CARTON UNLOADING AND UNIT UNSCRAMBLING MACHINE
Filed April 28, 1949 14 Sheets-Sheet 10
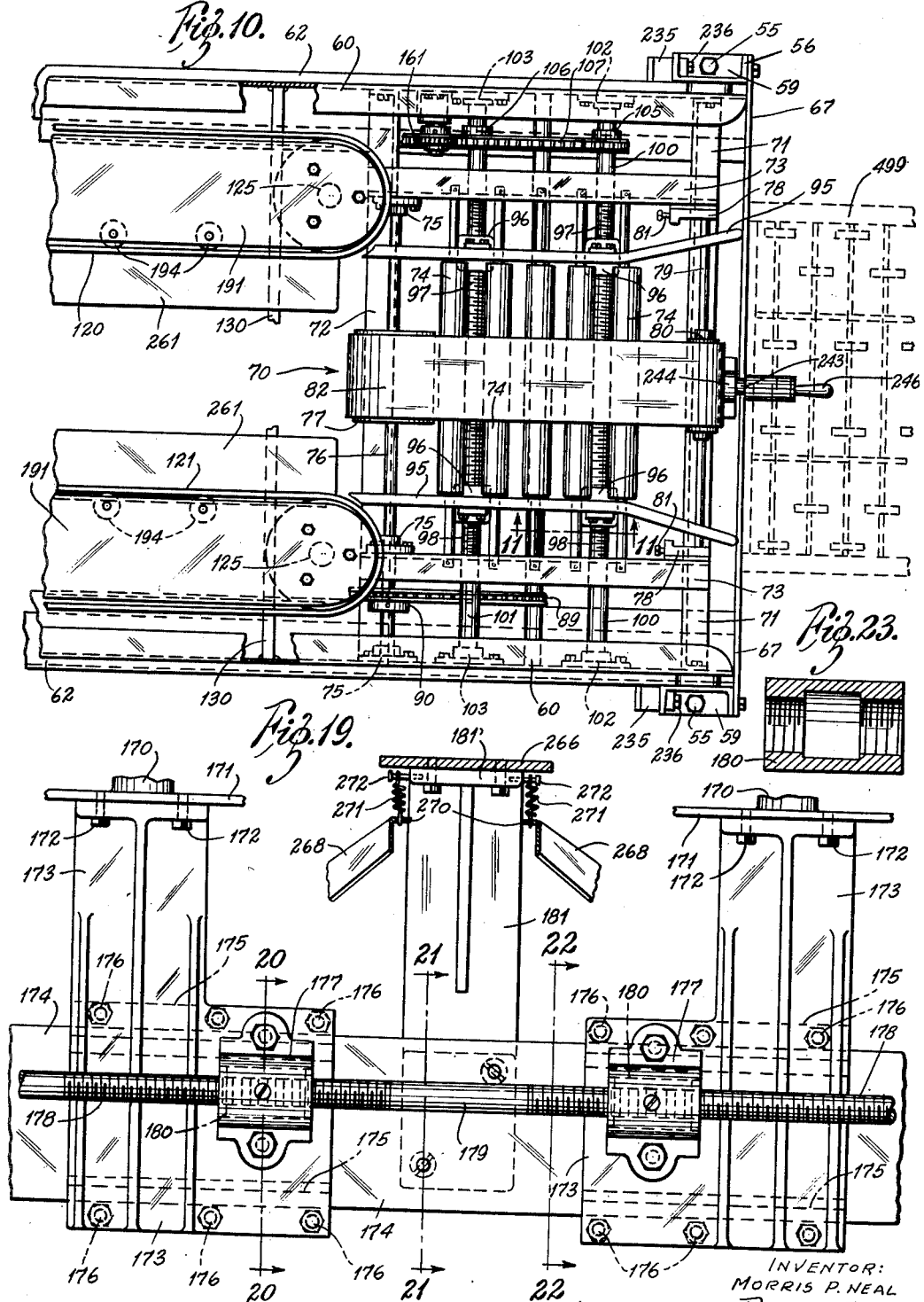
INVENTOR:
MORRIS P. NEAL
BY Rogers & Ezell
ATTORNEYS.

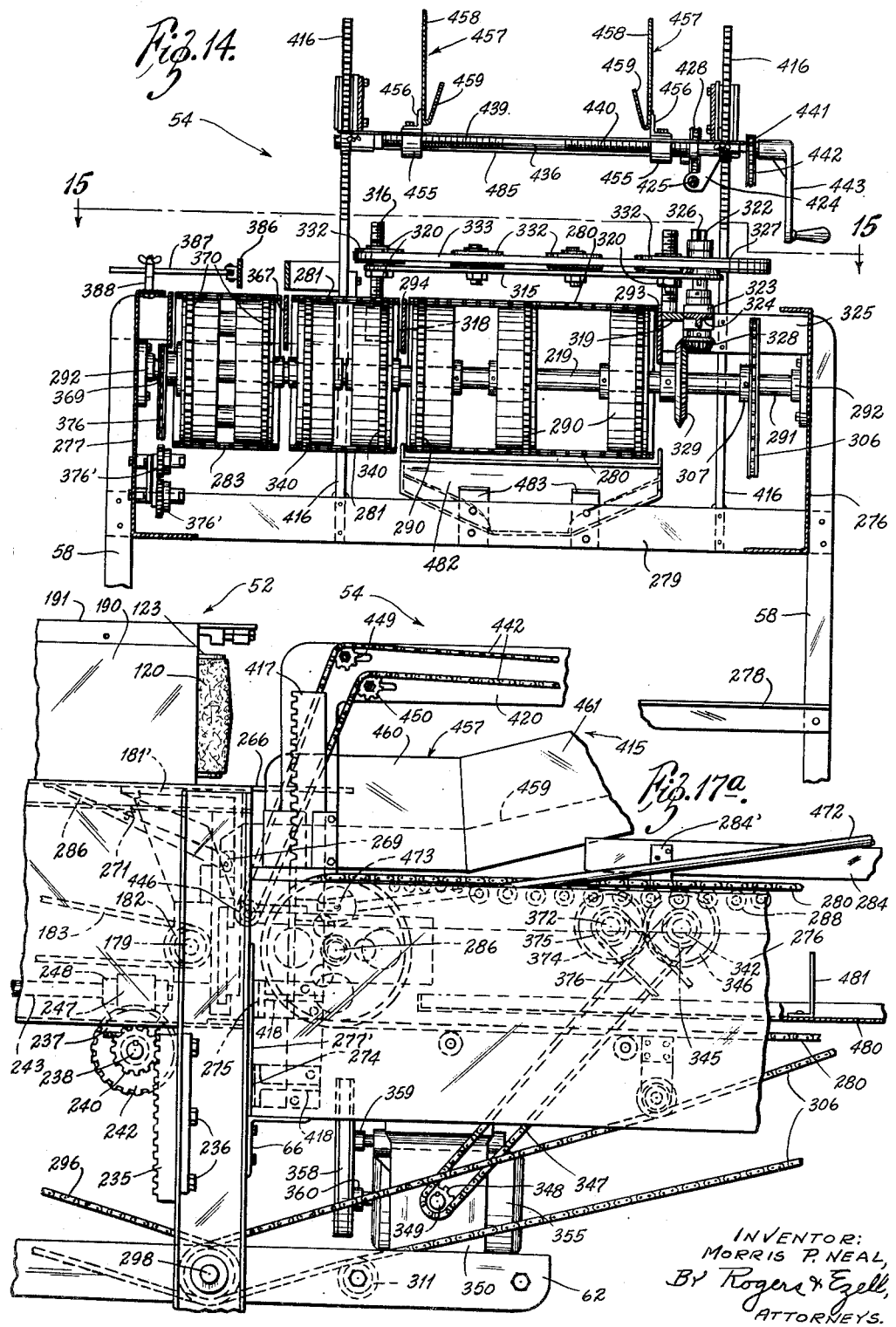

Aug. 11, 1953  M. P. NEAL  2,648,450
CARTON UNLOADING AND UNIT UNSCRAMBLING MACHINE
Filed April 28, 1949  14 Sheets-Sheet 12
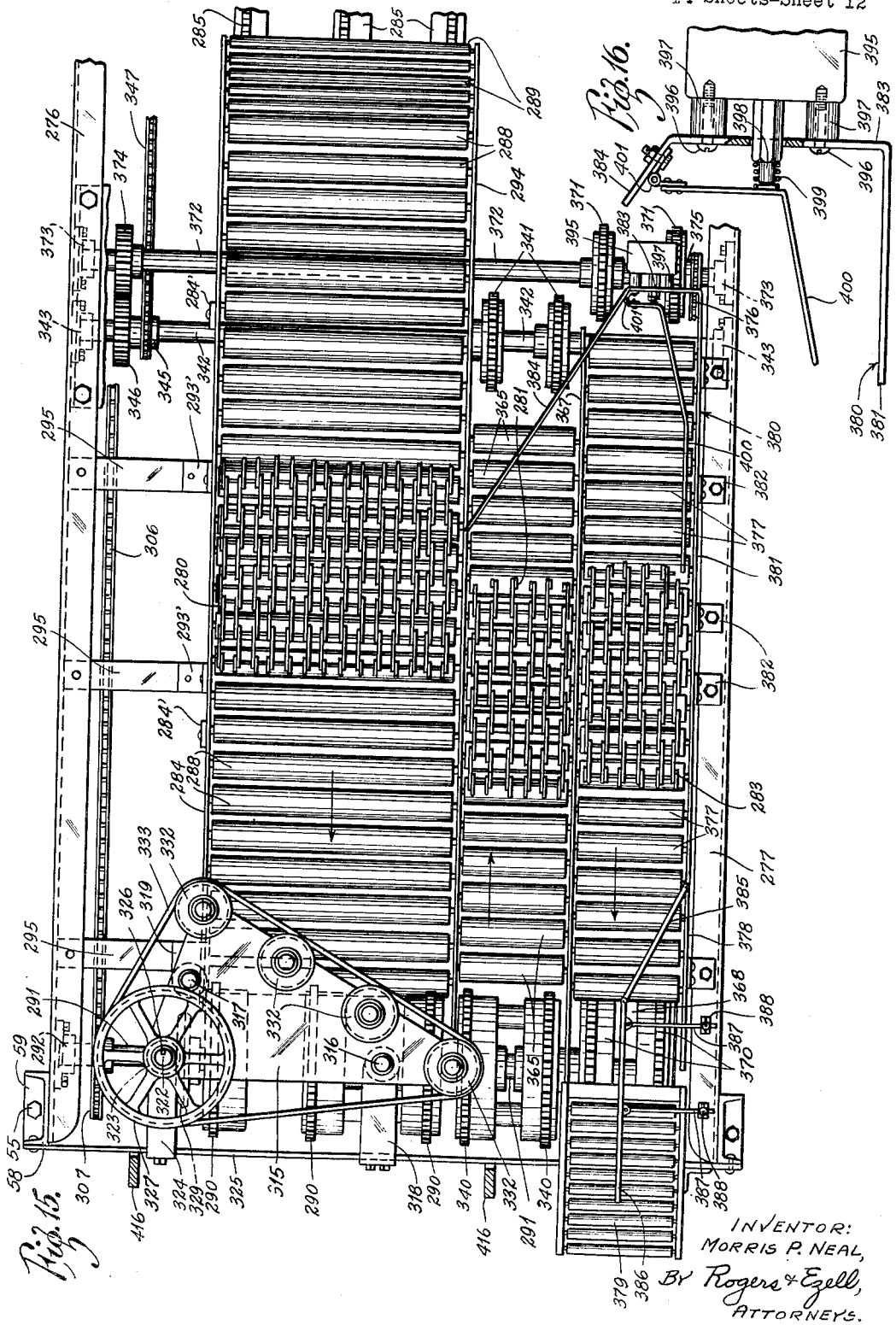
INVENTOR:
MORRIS P. NEAL,
BY Rogers & Ezell,
ATTORNEYS.

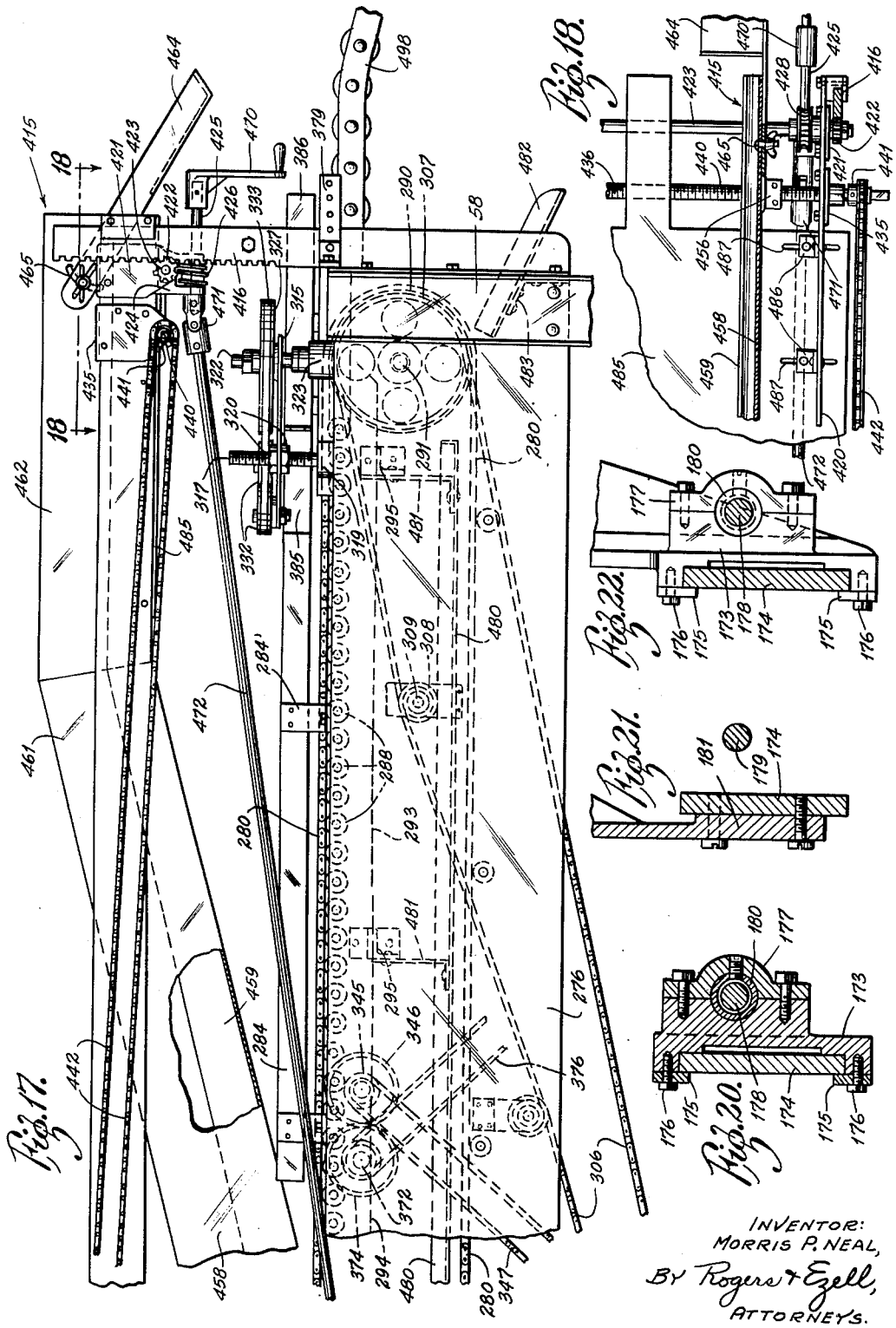

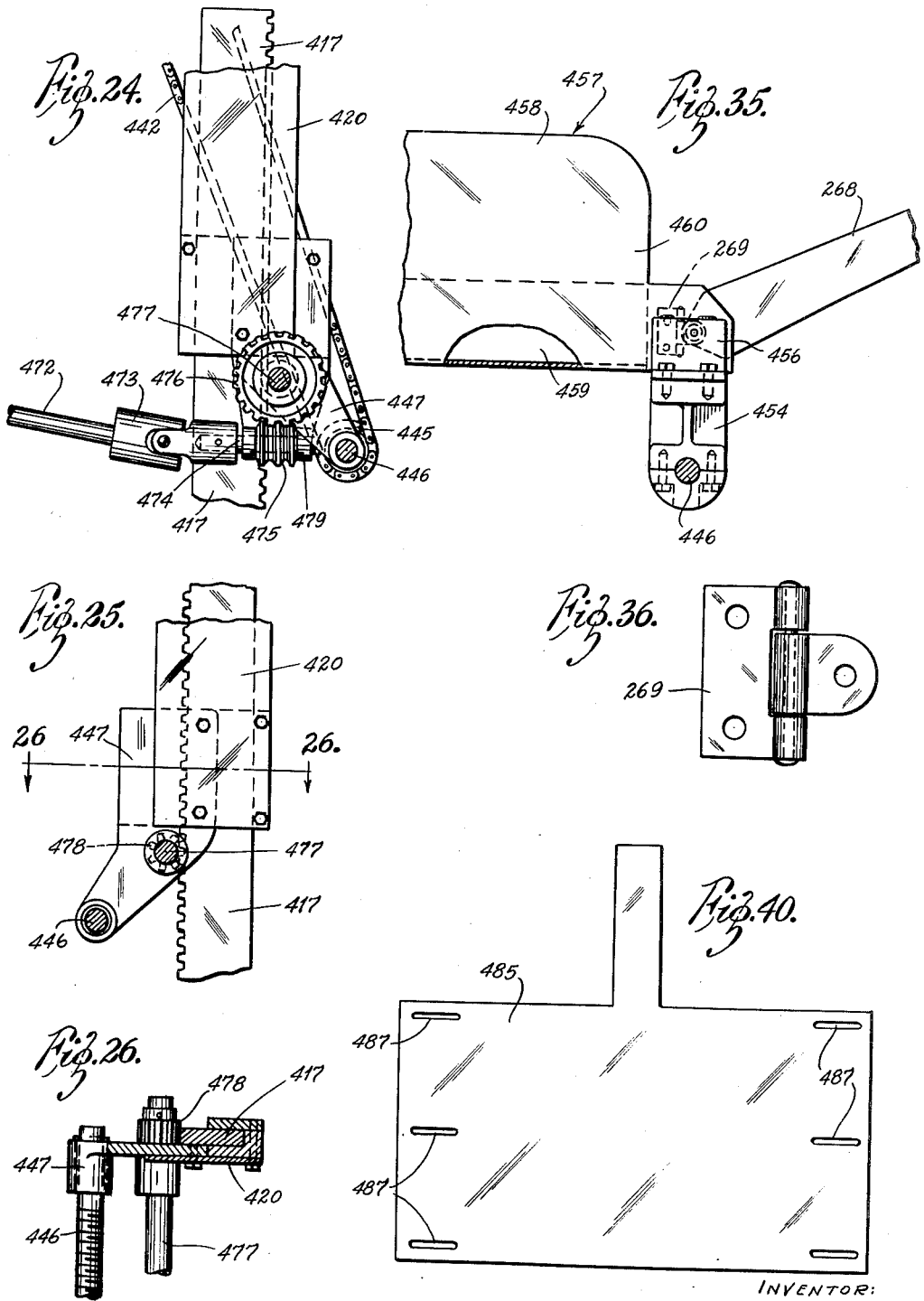

Patented Aug. 11, 1953

2,648,450

UNITED STATES PATENT OFFICE 2,648,450

CARTON UNLOADING AND UNIT UNSCRAMBLING MACHINE

Morris P. Neal, Moberly, Mo., assignor to A-B-C Packaging Machine Corporation, Moberly, Mo., a corporation of Illinois Application April 28, 1949, Serial No. 90,244

6 Claims. (Cl. 214—304)

The present invention relates generally to machinery for removing bottles, and the like, from cartons, and for unscrambling the individual bottles, cans, and the like, to present them in a single line or file at a conveyor which may carry them off to additional operations, and particularly to a machine which unloads bottles, or the like, disposed in the cartons in upside down position so that they are received on the unscrambling section of the machine in upright position, and in which the unscrambling mechanism efficiently and quickly separates the grouped bottles, and the like, and arranges them in single file for further operations.

Concisely, the present machine includes a mechanism for unloading bottles disposed in cartons in upside down positions and a mechanism for unscrambling the bottles after they have been unloaded from the cartons to dispose them in single file. Numerous details of the mechanisms which combine to form the present machine are also novel, as is manifest from the detailed description which follows and from the claims forming a part of the present application.

Therefore, an object of the present invention is to provide a novel carton unloading and individual unit unscrambler machine which efficiently performs the unloading and unscrambling operations.

Another object is to provide a novel carton unloading and unit unscrambling machine in which bottles, and the like, disposed in cartons in upside down position are unloaded and disposed on the unscrambling mechanism for the unscrambling operation, and in which the empty upside down cartons are righted for removal for further use.

Another object is to provide a novel carton unloading and unit unscrambling machine which is fully automatic both in normal carton and unit handling operations and is rectifying a unit jam on the unscrambler mechanism.

Another object is to provide a novel carton unloading and unit unscrambling machine which is adjustable in its major components for accommodation of cartons and units of different sizes.

Another object is to provide a novel carton unloading and unit unscrambling machine which incorporates a safety device effective to stop unit unloading upon the occurrence of a unit jam on the unscrambler mechanism.

Another object is to provide a novel carton unloading and unit unscrambling machine which is adapted to unload and to unscramble bottles, and the like, at high speeds, yet which reduces to a minimum bottle breakage both in unloading and in unscrambling.

Another object is to provide a novel carton unloading and unit unscrambling machine which reduces to a minimum down time due to carton unloading jams, to breakage and consequent jamming, and to unit jams on the unscrambler mechanism.

Another object is to provide a novel carton unloading and unit unscrambling machine which incorporates switch mechanism for maintaining cartons fed into the machine in spaced relation when it is found desirable to have them so spaced.

Another object is to provide a novel carton unloading and unit unscrambling machine which incorporates provision for disposing of any small and large pieces of glass, which may result from unloading, short of the final unit feed of the unscrambler mechanism.

Another object is to provide a novel carton unloading and unit unscrambling machine which may be readily synchronized with other machines of a selected unit filling line, or the like, to feed upright units to such other machines for predetermined labeling, filling, etc., operations.

Other objects are to provide a novel carton unloading and unit unscrambling machine which is sturdy in construction, which is constructed for long usage, which requires minimum maintenance, which may be used efficiently with little instruction, and which is adapted for wide usage.

The foregoing and other objects and advantages are apparent from the following description taken with the accompanying drawings, in which:

Fig. 1 is a diagrammatic top plan view of a carton unloader and unit unscrambler machine incorporating the teachings of the present invention (Sheet 1);

Fig. 2 is a diagrammatic side elevational view thereof looking in the direction of arrow A of Fig. 1 (Sheet 1);

Fig. 3 is a wiring diagram of the electrical circuits of the machine (Sheet 1);

Fig. 4 is a side elevational view of the carton unloader mechanism looking in the direction of the arrow A of Fig. 1 (Sheet 2);

Fig. 4a is a side elevational view of the major portion of the unit unscrambler mechanism, the remaining portion being shown in Fig. 4b, looking in the direction of arrow A of Fig. 1 (Sheet 3);

Fig. 4b is a side elevational view of the remainder of the unit unscrambler mechanism (Sheet 4);

Fig. 5 is a vertical substantially central longitudinal cross-sectional view through the carton unloader mechanism (Sheet 5);

Fig. 5a is a vertical substantially central longitudinal cross-sectional view through that portion of the unit unscrambler mechanism shown in Fig. 4a (Sheet 6);

Fig. 5b is a vertical substantially central longitudinal cross-sectional view through that portion of the unit unscrambler mechanism shown in Fig. 4b (Sheet 4);

Fig. 6 is a front end elevational view of the machine looking at the carton receiving end of the unloader mechanism (Sheet 7);

Fig. 7 is a vertical transverse cross-sectional view on substantially the line 7—7 of Fig. 4 (Sheet 8);

Fig. 8 is a vertical transverse cross-sectional view on substantially the line 8—8 of Fig. 4a (Sheet 9);

Fig. 9 is a vertical transverse cross-sectional view on substantially the line 9—9 of Fig. 4a (Sheet 9);

Fig. 10 is a plan view of the carton receiving end of the carton unloader mechanism (Sheet 10);

Fig. 11 is an enlarged vertical longitudinal cross-sectional view on substantially the line 11—11 of Fig. 10 (Sheet 7);

Fig. 12 is an enlarged vertical longitudinal cross-sectional view on substantially the line 12—12 of Fig. 7 (Sheet 7);

Fig. 13 is an enlarged vertical longitudinal cross-sectional view on substantially the line 13—13 of Fig. 7 (Sheet 7);

Fig. 14 is a vertical transverse cross-sectional view on substantially the line 14—14 of Fig. 4b (Sheet 11);

Fig. 15 is a horizontal cross-sectional view on substantially the line 15—15 of Fig. 14 (Sheet 12);

Fig. 16 is an enlarged fragmentary view of the construction at the lower right hand corner of Fig. 15 (Sheet 12);

Fig. 17 is an elevational view of the rear portion of the unit unscrambler mechanism with one crank removed, showing the side opposed to that illustrated in Fig. 4b (Sheet 13);

Fig. 17a is an elevational view of the forward portion of the unit unscrambler mechanism, continuing Fig. 17 (Sheet 11);

Fig. 18 is a fragmentary horizontal cross-sectional view taken on substantially the line 18—18 of Fig. 17 (Sheet 13);

Fig. 19 is an enlarged fragmentary vertical transverse cross-sectional view taken on substantially the line 19—19 of Fig. 5 (Sheet 10);

Figs. 20, 21, and 22 are vertical longitudinal cross-sectional views on substantially the lines 20—20, 21—21 and 22—22 of Fig. 19 (Sheet 13);

Fig. 23 is a cross-sectional view through an internally threaded bushing (Sheet 10);

Figs. 24 and 25 are enlarged fragmentary vertical longitudinal cross-sectional views on substantially the lines 24—24 and 25—25 of Fig. 8 (Sheet 14);

Fig. 26 is a horizontal cross-sectional view on substantially the line 26—26 of Fig. 25 (Sheet 14);

Fig. 27 is a detail view, partly in section, of the forward drive shaft with the supported sprockets which drive the final bottle discharge conveyer chain belt (Sheet 8);

Fig. 28 is a view similar to Fig. 27 of the adjacent shaft and sprockets for driving the intermediate conveyer chain belt (Sheet 8);

Fig. 29 is a plan view of a hinged support member for carton side flaps (Sheet 8);

Fig. 30 is a plan view of a plate which engages the end flaps of an upside down carton to hold unloaded bottles in place until the same are over the receiving conveyer chain belt (Sheet 6);

Fig. 31 is a side elevational view thereof (Sheet 6);

Fig. 32 is a plan view, partly in section, of a side flap opener finger (Sheet 5);

Fig. 33 is a side elevational view thereof (Sheet 5);

Fig. 34 is an end elevational view thereof (Sheet 5);

Fig. 35 is a detail view, partly in section and partly in side elevation, of the forward end of one carton side flap receiving guide and mounting, the view also showing the mounting of the finger shown in Fig. 32 (Sheet 14);

Fig. 36 is a detail view of a hinge which receives the finger of Fig. 32 (Sheet 14);

Fig. 37 is a forward end view of the left hand carton side flap receiving guide (Sheet 4);

Fig. 38 is a framentary enlarged side elevational view of a portion of the transverse adjustment assembly for the left hand carton side flap receiving guide, the shaft being broken away and the guide being in section (Sheet 4);

Fig. 39 is an end view thereof, the shaft being in section and the guide being broken away (Sheet 4); and Fig. 40 is a top plan view of a plate which supports partition assemblies or unit separators until the cartons are righted.

Referring to the drawings more particularly by reference numerals, there is diagrammatically illustrated in Figs. 1 and 2 a carton unloading and unit unscrambling machine 50 constructed in accordance with the teachings of the present invention. Broadly, the machine 50 includes a carton unloading mechanism 52 and a unit unscrambler mechanism 54 which are synchronized to unload upside down bottles or other units from cartons in upright positions and to unscramble the same for further operations. Forward, intermediate, and rear pairs of legs 56, 57, and 58, respectively, shown as channel iron members, support the machine 50, each of which may include an integral foot flange portion 59 for receiving bolts 55 in anchoring the machine 50 on a foundation 61.

Specifically considering the carton unloading mechanism 52, the supporting frame therefor includes the spaced pairs of forward legs 56 and intermediate legs 57, and uniting longitudinal inturned angle iron side frame members 62 secured thereto by suitable rivets 63, or the like, the members 62 extending rearwardly beyond the intermediate legs 57, shafts 64 secured to the pairs of legs 56 and 57 adjacent the bottom thereof by suitable bolts, a transverse channel member 65 extending across the members 62 and secured to the upper flange thereof by suitable bolts adjacent the legs 56, a transverse angle iron member 66 secured to the intermediate legs 57 by suitable bolts, a front transverse strap 67, and other reinforcing and supporting members mentioned below.

A loaded carton receiving unit 70 is supported between the forward ends of two spaced rigidly connected vertically adjustable longitudinal main frame plates 69 of channel cross section, the mounting of which is more particularly described below (Figs. 4, 5, 6 and 10). Spaced transverse angle iron members 71 and 72 are secured to the plates 69 by suitable bolts. Spanning the angle members 71 and 72 and bolted thereto are spaced channel iron members 73. The channel members 73 support spaced rollers 74, five being shown (Figs. 6 and 10). Each channel member 73 also supports a bearing 75 which rotatably receive a shaft 76. The shaft 76 extends through the left hand channel member 73 and is supported at its free end in a third bearing bolted to the frame plate 69. A drum 77 is secured to the shaft 76 by a suitable setscrew, or the like, for rotation therewith. A longitudinally slotted bracket 78 having an adjustment screw 81 is secured to the forward end of each channel member 73, the brackets 78 adjustably supporting a shaft 79 for rotation, which intermediate the ends has secured thereto a small cylindrical roller 80. An endless belt 82 is disposed about the drum 77 and the roller 80. The brackets 78, through the screws 81, permit the proper tension to be placed on the endless belt 82. A suitable motor 83 and adjacent reduction gearing 84 for powering the belt 82 are bolted to spaced pairs of transversely disposed straps 85 which extend between the plates 60 and are secured to the lower flanges thereof by rivets or the like. A motor of one-half horsepower has been found to be adequate. A small sprocket 87 is secured by a setscrew to a power take-off shaft 88 extending from the gear reducer 84. An endless chain 89 is trained about the sprocket 87 and about a larger sprocket 90 secured to the shaft 76 between the plate 60 and channel member 73 by a suitable setscrew, or the like. As is clear from Fig. 5, the upper reach of the endless belt 82 moves across the rollers 74 which lend support to a loaded carton being fed into the machine 50 for unloading. During operation of the machine 50, the motor 83 continuously drives the endless belt 82.

A carton guide rail 95 is adjustably mounted at each side of the endless belt 82 (Figs. 4, 5, 6, 10 and 11). As is clear from Fig. 10, the guide rails 95 are divergingly related at their receiving ends in order to easily accommodate and guide a carton into position on the belt 82. Each guide rail 95 is mounted on the vertical extensions of a pair of split sleeve internally threaded guide brackets 96, being secured thereto by suitable bolts (Fig. 11). The opposed brackets 96 are oppositely threaded and engage oppositely threaded segments 97 and 98 of shafts 100 and 101 rotatably mounted at their ends in bearings 102 and 103, respectively, which are supported by the channel frame plates 60 through bolts, or the like. Small sprockets 105 and 106 are secured to the shafts 100 and 101, respectively, near common ends thereof which receive an endless chain 107 (Figs. 5 and 10). This chain 107, its power means, and its effect on the guide rails 95 are more particularly referred to below, it being clear from Fig. 5 that only a part of its upper reach is in engagement with the small sprockets 105 and 106. Movement of the chain 107 effects inward and outward movement of the guide rails 95, depending upon the direction of travel.

Extending upwardly from and secured to the rearmost or right hand guide rail 95, considering Figs. 4 and 5, is a plate 108 which adjustably supports two micro-switches 109 and 110 through the medium of a slot 111 and suitable bolts. The micro-switches 109 and 110 include pivoted actuator arms 112 and 113, respectively, which extend into the path of inwardly moving loaded cartons. The micro-switches 109 and 110 are in series and together energize a motor more particularly referred to below.

Rearwardly of the unit 70 are adjustably mounted parallel longitudinally and edge wise disposed belts 120 and 121 which form vertical walls for receiving loaded cartons from the belt 82, and which move such cartons through a predetermined portion of travel (Figs. 4–8, 10, 12, 13, and 19). Longitudinally spaced drums 122 and 123 support each of the belts 120 and 121. Each drum 122 is secured to the upper end of a vertical shaft 125 by setscrews, or the like, which is rotatably mounted in vertically spaced aligned bearing elements 126 and 127 formed integral with a bracket 128 of the configuration clearly shown in Figs. 4, 7, 12, and 13, which is slidably mounted on a heavy transverse member 130 disposed between and secured at its end to the channel plates 60 through suitable bolts, or the like. Strips 131, through securing bolts 132, maintain the brackets 128 in position on the member 130 for transverse sliding movement. A bevelled gear 133 is secured to the lower end of each shaft 125 by a setscrew, or the like. Each bracket 128 also includes a split internally threaded clamp 136 and a depending bearing sleeve 137. The two split clamps 136 are oppositely threaded and engage oppositely threaded segments 140 and 141 of a shaft 142 which is supported at its ends for rotation by bearings 143 mounted on the channel plates 60 through suitable bolts. The shaft 142 is supported intermediate its ends by a bracket 144 secured by suitable bolts to a plate 145 which, in turn, is secured by bolts to the transverse member 130. A driven shaft 150 extends through the sleeves 137 and is rotatably mounted in bearings 151 which are secured by suitable bolts to the channel plates 60. The shaft 150 extends through the left hand bearings 151 and has a sprocket 152 of selected diameter secured to the free end thereof (Fig. 4). A bevelled gear 153 is secured to each of the sleeves 137 for relative rotation and for longitudinal movement therewith along the shaft 150, each bevelled gear 153 being secured to the shaft 150 for rotation therewith, but for longitudinal or axial movement in respect thereto through a suitable slot 154 and usual pin (not shown). Each bevelled gear 153 is in engagement with an adjacent bevelled gear 135. A small sprocket 155 is secured to the shaft 142 near the right hand end over which is trained the above-mentioned chain 107. This chain 107 also engages two idler sprockets 160 and 161 which are rotatably mounted on brackets secured to the adjacent channel plate 60. The shaft 142 extends through the right channel plate 60, considering Fig. 7, and has removably secured to the free end an operating crank 165.

Each of the drums 123 is freely rotatably mounted on a stationary vertical shaft 170 which is welded or otherwise secured to a plate 171 secured by bolts 172 to the upper end of a bracket 173 of the configuration clearly shown in Figs. 4, 5, and 19. The plates 171 are of channel cross section and extend the full length beneath the belts 120 and 121 for purposes described below, being supported forwardly on the brackets 128 (Figs. 7 and 19). Each bracket 173 is slidably mounted on a transverse frame member 174 of rectangular cross section in the same manner as the brackets 128, the members 174 being secured to the channel plates 60 by bolts, or the like. Suitable strips 175 are secured to the brackets 173 by bolts 176 and overlie the member 174. Each bracket 173 includes a split clamp 177 having secured therein a threaded bushing 180 (Figs. 20 and 23) which engages a threaded segment 178 of a shaft 179 rotatably mounted at its ends in suitable bearings (not shown) secured to the channel plates 60 by bolts. The threaded segments 178 and the split clamps 177 are oppositely threaded. Between the brackets 173 is a vertical plate 181 which is bolted to the member 174 and which includes a horizontal flange 181'. A small sprocket 182 is secured to the shaft 179 near the right hand channel plate 60 (Fig. 5). A chain 183 is trained around the sprocket 182 and about a sprocket 184 secured to the shaft 142 (Fig. 7). Intermediate the ends, the endless chain 183 is trained over adjustable idler sprockets 186 and 187 which are rotatably mounted on suitable spindles vertically adjustably mounted in brackets 188 secured to the adjacent channel plate 60.

It is manifest that, by selected rotation of the crank 165, the two belts 120 and 121 and the two guide rails 95 may be moved toward or away from each other.

A side guard plate 190 is mounted adjacent the outer face of each of the belts 120 and 121, being welded or otherwise secured to the outer flange of the respective plate 171. To the upper offset edge of each of the guard plates 190 is secured by bolts the outer edge of a top plate 191. Each of the rotatable shafts 125 is braced at its top by rotatable engagement with a bearing 192 bolted to the lower surface of each plate 191 (Figs. 4 and 7). Likewise, each shaft 170 has its end fitted in a bearing 193 bolted to the inner surface of each plate 191 for bracing effect (Fig. 4). Rollers 194 are rotatably supported between the plates 171 and 191 adjacent the inner reaches of the belts 120 and 121 to maintain the same taut (Figs. 7 and 10).

Power for rotating the belts 120 and 121 is supplied by a motor 200 through a reduction gearing unit 201 which are disposed beneath the belts 120 and 121 (Figs. 4, 5, and 7). A motor of one horsepower has been found to be adequate. The motor 200 and the reduction unit 201 are supported on pairs of angle members 202 and 203, respectively, which span and are pierced by a pair of spaced shafts 204, the shafts 204 being supported at their ends in the vertical flanges of the angle iron frame members 62, the shafts 204, including threaded reduced ends which receive nuts 205. The unit 201 is fixed to the shafts 204 by setscrews, or the like, but the motor 200 is movable on the shafts 204 for speed adjustment. A threaded shaft 206 threadedly engages the left hand member 202 and extends through the member 62, being retained by collars and setscrews and having a squared end for reception of a crank (not shown).

The power of the motor 200 is transmitted to the reduction unit 201 by means of an adjustable speed belt 207, which is trained around a sheave 200' fixed to the rotor shaft of the motor 200 and around a large wheel 201' fixed to a shaft extending into the reduction unit 201. Extending from the gear reduction unit 201 is a suitable power take-off shaft 208 to which are secured for rotation therewith two small sprockets 209 and 210 (Fig. 7). Around the sprocket 209 is trained a chain 212, the other end of which is trained around a larger sprocket 213 which is secured to a shaft 214 for rotation therewith (Figs. 4, 5, and 7). An idler sprocket 228 mounted on a spring biased arm 229 pivotally connected to the angle member 203 engages the lower reach of the chain 212. The shaft 214 is rotatably mounted in bearings 215 which are secured by suitable bolts, or the like, to the horizontal flanges of the frame members 62. As is clear from Fig. 7, the shaft 214 extends through the left hand bearing 215 and has a sprocket 216 secured to the free end thereof for rotation therewith. As is clear from Fig. 4, the shaft 214 is disposed directly beneath the shaft 150 which carries the sprocket 152. A reinforced chain guard 220 is pivotally mounted at one end on the shaft 214 through a suitable bearing 220'. Similarly, a reinforced chain guard 221 is pivotally mounted on the free end of the shaft 150 through a suitable bearing 221'. As is clear from Fig. 4, the chain guards 220 and 221 are disposed in converging relationship, and are pivotally connected through suitable bearings by a stub shaft 222 on which are mounted two sprockets 223 and 224 (Fig. 4). An endless chain 226 is trained around the sprockets 216 and 223 and another endless chain 227 is trained around the sprockets 224 and 152. Hence, a vertically adjustable power transmission device is provided.

The motor 200 is energized by the microswitches 109 and 110, as is more particularly described below, it being obvious from the foregoing detailed description that the belts 120 and 121 will be rotated when the motor 200 is energized.

The belts 120 and 121 and the belt 82, together with supporting and related parts, are vertically adjustable as a unit. A rack 235 is secured by bolts 236 to the interior flange of each of the four legs 56 and 57 (Figs. 4-7). Each channel plate 60 is supported at each end on a bearing 237, opposed pairs of which rotatably receive spaced shafts 238. Each of the shafts 238 has its free ends outwardly of the bearings 237, a pinion 240 being secured to each free end for rotation therewith. Each pinion 240 is in engagement with a rack 235, this connection between pinions 240 and racks 235 comprising the support for the channel plates 60 and the mechanism carried thereby. A large worm gear 242 is secured to each shaft 238 intermediate the ends thereof, one being left hand and the other right hand. For operation of the shafts 238, there is provided a long, longitudinally extending shaft 243 rotatably supported at the front end in a bracket 244 bolted to a front strap member 261 and intermediate its ends in a bracket 245 bolted to an intermediate strap member 239, to the front end of which is removably connected an operating crank 246. A worm gear 247 is secured to the front and rear ends of the shaft 243 above each worm gear 242 and in engagement therewith, the worm gears 247 being correspondingly threaded with the worm gears 242. Each worm gear 247 is splined or otherwise secured to the shaft 243 and is disposed between spaced sleeves 248 forming integral parts of a bracket 249 (Fig. 5). The shaft 243 extends through the sleeves 248. A sleeve 251 is formed integral with each bracket 249 which depends therefrom and surrounds the respective shaft 238. Hence, the shaft 243 is thus tied into the shafts 238 insuring a rigid operative construction. Manifestly, rotation of the crank 246 will effect vertical movement of the channel plates 60 and therewith vertical movement of the belts 120 and 121, and the belt 82.

In order to dispose the flaps of a loaded carton 255 being handled by the machine 50 in proper positions for unloading of the contained units, there are provided flap engaging elements between the belts 120 and 121. A plate 261 of elongated form is hingedly connected to the inner flange of each of the plates 171 by suitable hinges 262 (Figs. 5, 7, and 29). An adjusting screw 263 is provided for each plate 261 which is mounted in an arm 264 connected to the plate 171. Hence, the plate 261 may be positioned as desired to allow an initial partial opening of longitudinal flaps 256 of the carton 255. Between and towards the rear of the belts 120 and 121 is an elongated plate 266 which is mounted at its rear end on the vertical plate 181 (Fig. 5, 19, 30, and 31). A resilient member 267 is riveted or bolted to the forward end of the plate 266 having a downturned lip to insure the trailing end flaps of cartons 255 moving onto the plate 266. Two side flap opening fingers 268 are pivotally connected at base ends to hinges 269, each of which is secured to the inner forward end of a carton guide 457 more particularly described below (Figs. 5, 8, 19, 35 and 36). Each flinger 268 includes an intermediate apertured boss 270 which receives an end of a spring 271, the other end of each spring 271 being anchored on a pin 272 secured to the horizontal portion 181' of the plate 181, the fingers thus being biased into converging relation (Fig. 19). The free ends of the fingers 268 rest beneath the plate 266 (Fig. 5a). The fingers 268 deflect carton side flaps 256 into vertical depending positions for movement into guides after they leave the plates 261. The pivotal mounting and spring suspension of the fingers 268 permit automatic adjustment thereof when lateral adjustment of the machine 50 are necessary.

Referring to the unscrambler mechanism 54, the common intermediate legs 57 and the rear legs 58 support a framework which includes the above-mentioned transverse member 66 bolted to the legs 57, channel members or plates 276 and 277 which are supported at one end on and are bolted to the angle beam 66 and are secured at the other end by rivets to the legs 58, transverse straps 274 and 275 bolted to the rear flanges of the legs 57, an angle iron 278 riveted to the forward flanges of the legs 58, and a strap member 279 bolted to the rear flanges of the legs 57 (Figs. 4a, 4b and 8). The channel member 277 includes a vertical flange 277' at its forward end which is bolted to the rear flange of the adjacent leg 57, and the member 276 is secured to the upper end of the adjacent leg 57 by a bracket 273 and anchoring bolts (Fig. 8).

The unscrambler mechanism 54 includes three parallel conveyer chain belts 280, 281, and 283, the center one of which moves in opposite direction to the other two (Figs. 5a, 5b, and 15).

The chain belt 280, which is the unit receiving conveyer and is wider than the other two, at the forward end is trained around three spaced large sprocket wheels 285 which are freely mounted on a shaft 286 supported at its ends in bearings 287 bolted to the inner surfaces of the channel members 276 and 277 (Fig. 8). The bearings 287 are adjustably mounted to permit tensioning of the chain belt 280 (not shown). The sprockets 285 are maintained against longitudinal movement along the shaft 286 by collars, or the like (not shown), in order to insure against lateral movement of the forward end of the chain belt 280. At its rear end, the chain belt 280 is trained around three large sprocket wheels 290 of the same size and construction as the sprocket wheels 285, which are secured to a shaft 291 by setscrews, or the like, for rotation therewith (Fig. 14). The shaft 291 extends across the mechanism 54 and is supported at its ends in bearings 292 which are bolted to the inner surfaces of the channel members 276 and 277.

Vertical strap members 293 and 294 are disposed adjacent the top reach of the chain belt 280, being supported on transverse angle iron members 295 riveted at the ends to the channel members 276 and 277. Brackets 293' anchor the strap 293 to the members 295. Large rollers 288 and small end rollers 289 are rotatably supported by the strap members 293 and 294, the rollers 288 and 289 supporting the upper reach of the chain belt 280 (Figs. 5a and 15). A unit guide rail 284 is supported by the strap members 293 through small vertical plates 284' which prevents units from falling off the right side of the chain belt 280.

The above-mentioned motor 200 also furnishes the driving power for the chain belt 280 (Figs. 5, 5a, 5b, 8, and 14). An endless chain 296 is trained around the small driven sprocket 210 mentioned above (Fig. 7) and around a larger sprocket 297 secured to a shaft 298 by setscrews, or the like, rotatably mounted at its ends in bearings 299 secured by suitable bolts to the vertical flanges of angle iron members 62 and to the intermediate legs 57 (Fig. 8). An idler sprocket 300 rotatably mounted on the end of a pivotally mounted arm 301 maintains the chain 296 taut, as is clear from Fig. 5. The arm 301 is pivotally mounted on the rearwardly disposed shaft 204, and is spring biased into chain tightening position. A second sprocket 305 is secured to the shaft 298 by a suitable setscrew adjacent the sprocket 297. A long chain 306 is trained at one end around the sprocket 305. At its other end, the chain 306 is trained around a large sprocket 307 which is secured by a suitable setscrew, or the like, to the shaft 291 for rotation therewith. An adjustably mounted idler sprocket 308 engages the upper reach of the chain 306 intermediate its ends for maintaining the same in taut relation, the sprocket 308 being mounted on a stub shaft 309 adjustably supported by a bracket 310 secured to the inner surface of the channel member 276. An idler sprocket 311 engaging the lower reach of the chain 306 is mounted on the forward shaft 352 for rotation (Figs. 5a and 9).

A plate 315 of triangular configuration is disposed above the conveyer chain belt 280 at its rear end. The plate 315 is vertically adjustably mounted on two threaded posts 316 and 317 which are rigidly supported by brackets 318 and 319, respectively, which are bolted to the members 325 and 295, respectively. Upper and lower nuts 320 on the posts 316 and 317 receive the plate 315 therebetween. At one corner, a vertical shaft 322 extends through the plate 315, being rotatably supported in a bearing 323 mounted on a bracket 324 which is supported by a transverse frame member 325 riveted to the upper ends of the legs 58. The shaft 322 is split at 326 for a major portion of its length and receives a large sheave 327 above the plate 315. A bevelled gear 328 is secured to the lower end of the shaft 322 by a setscrew and is in engagement with a larger bevelled gear 329 which is secured to the shaft 291 by a suitable setscrew, or the like (Fig. 14).

Four freely rotatable small sheaves 332 are mounted on the plate 315 along one side thereof on vertical stub shafts secured in place by nuts, as is clear from Fig. 15, which, together with the large sheave 327, receive an endless belt 333. It is clear from the foregoing that the endless belt 333 is driven simultaneously with the conveyer chain belt 280 by the motor 200.

The second or intermediate conveyer chain belt 281, which is of a width substantially half that of the conveyer chain belt 280, is trained at one end around two large sprocket wheels 340 which are of the same size as the sprocket wheels 290 and which are freely rotatable on the shaft 291 (Figs. 14, 15). At its other end, the conveyer chain belt 281 is trained around two smaller sprocket wheels 341 which are secured by suitable setscrews, or the like, to a driven transversely disposed shaft 342 which is rotatably and adjustably mounted at its end in bearings 343 which are secured by suitable nuts to the inner surfaces of the channel members 276 and 277 (Figs. 15 and 28). At the end of the shaft 342, remote from the sprocket wheels 341, is a small sprocket 345 secured to the shaft 342 by a suitable setscrew for rotation therewith. Adjacent the sprocket 345 is a gear 346 which is also secured to the shaft 342 by a suitable setscrew for rotation therewith. An endless chain 347 is trained over the sprocket 345 and over a small sprocket 348 secured by a suitable setscrew, or the like, to a stub shaft 349 extending from and serving as the power take-off of a gear reducing unit 350 which is mounted beneath the forward end of the unscrambler mechanism 54 on angle members 351 which are supported by and secured to spaced shafts 352 mounted at the ends on the vertical flanges of the angle members 62 (Figs. 5a and 9). Adjacent the gear reducing units 350 is a motor 355 which is mounted on angle members 356 supported by the shaft 352 for relative movement. A motor of one-half horsepower has proven adequate. A threaded shaft 357 threadedly engages a threaded aperture in the vertical flange of the angle member 356 remote from the reducing unit 350. The member 357 extends through the member 62 and is formed at its end to receive a crank, being held against movement relative to the member 62 by suitable collars. Power is transmitted from the motor 355 to the gear reducing unit 350 by means of an endless belt 358 which is trained around a large sheave 359 secured to a shaft extending into the gear reducing unit 350 and around a smaller sheave 360 secured to the rotor shaft of the motor 355. The relationship of the belt 358 and the sheave 360 is such that movement of the motor 355 from and towards the unit 350 changes the effective speed of the motor 355 as transmitted therefrom to the large sheave 359.

The upper reach of the conveyer chain belt 281 is supported by a plurality of freely rotatable rollers 365, the ends of which are mounted in the strap member 294 and a parallel strap member 367, the strap member 367, like the strap member 294, being supported intermediate its ends by the transverse straps 295.

The conveyer chain belt 283 is of substantially the width of the conveyer chain belt 281 and is trained at one end around two large sprocket wheels 370 of the same size as the sprocket wheels 290 and 340, which are freely rotatably mounted on the shaft 291. The sprocket wheels 370 are fastened together by suitable spacers 368 and bolts, and to this assembly is welded a small sprocket 369. At its forward end, the conveyer chain belt 283 is trained around a pair of smaller sprocket wheels 371 which rotate freely on a shaft 372, being retained against movement along the shaft 372 by setscrew retained collars (Figs. 15 and 27). The shaft 372 is rotatably and adjustably mounted at its ends in bearings 373 which are secured by bolts to the inner face of the channel members 276 and 277. A gear 374 is secured by a setscrew to the shaft 372 at the end remote from the sprocket wheels 371 and meshes with the gear 346 secured to the shaft 342. A sprocket 375 is secured to the shaft 372 by setscrews, or the like. An endless chain 376 is trained around the sprocket 375 under adjustably mounted idler sprockets 376′, and around the sprocket 369 which is attached to the sprocket wheels 370. The conveyer chain belt 283 is supported intermediate its ends by rollers 377 which are freely rotatably supported by the longitudinal strap member 367 and an additional longitudinal strap member 378 supported like the strap member 267. A roller conveyer section 379 is secured in position at the discharge end of the chain belt 283. The adjustable mounting of the ends of the shafts 342 and 372 permits the use of different size gears 346 and 374 to change the speed of the chain belt 283 relative to the chain belt 281.

A unit guide rail 380 is provided which includes a base portion 381 secured to the vertical portions of brackets 382 bolted to the top flange of the channel member 277. Extending at right angles to the base portion 381 is a portion 383 which extends inwardly across a portion of the conveyer chain belt 283. An angularly disposed portion 384 forms a continuation of the portion 383 and extends diagonally across a portion of the conveyer chain belt 283 and diagonally across the conveyer chain belt 281, as is clear from Fig. 15. The free end of the portion 384 is secured to the longitudinal member 294 for support. To the other end of the base portion 381 is hingedly connected a portion 385 which, in turn, hingedly receives a portion 386. Arms 387 are pivotally connected to the portion 386 and are adjustably mounted in brackets 388 at their free ends, the brackets 388 being supported by the upper flange of the channel member 277. As is clear from Figs. 14 and 15, the brackets 388 are in the form of pivotally mounted posts so that the arms 387 may swing as well as slide axially.

A micro-switch 395 is secured to the outer face of the rail portion 383 by screws 396 and sleeves 397 (Figs. 15 and 16). An actuating plunger 398 extends through an aperture in the portion 383 and is surrounded at its free end by a compression spring 399 which extends beyond such free end. An auxiliary fence member 400, formed as clearly indicated in Figs. 15 and 16, is secured by a hinge 401 to the front of the rail portion 384 in a position for engagement with the spring 399. A jamming against the auxiliary fence 400 of units being unscrambled will overcome the force of the spring 399 and move the plunger 398 inwardly to open the micro-switch 395, which will deenergize the motor 200, the switch 395 being connected into the circuit of the motor 200, as is more particularly described below.

Vertically and laterally adjustable construction 415 is provided for supporting cartons as contents are dropped therefrom to the chain belt 280 and for removing the empty cartons. Two vertical rack bars 416 are provided at the discharge end of the unscrambler mechanism 54 and two vertical rack bars 417 are provided at the other end thereof, the rack bars 416 being bolted and welded to the transverse strap members 279 and 325 (Figs. 5b and 15), and the two rack bars 417 being secured to the transverse strap members 274 and 275 by angle brackets 418 (Fig. 8). An L-shaped member 420 is supported by the two rack bars 416 and 417 at each side of the mechanism 54 (Figs. 4a, 4b, 5a, 5b, 14 and 17).

An L-shaped member 420 has riveted at the free end of the horizontally extending leg portion thereof a bracket 421 which rotatably supports a shaft 423 beneath the leg portion of the member 420, the shaft 423 having a pinion 422 secured to each free end by a setscrew, each of which is in engagement with the teeth of the respective rack bar 416 (Figs. 4b, 5b, 17 and 18). The left hand bracket 421 includes a depending U-shaped portion 424 which extends inwardly of the rack bar 416 (Fig. 14), the legs of which are apertured and receive for rotation a stub shaft 425 which has splined thereto a worm wheel 426 disposed between the legs of the U-shaped portion 424. The shaft 423 which supports the pinions 422 has secured thereto a worm wheel 428 which is in engagement with the worm wheel 426.

Adjacent each bracket 421 is a bracket 435 which is riveted to the member 420 (Figs. 4b and 17). The opposed brackets 435 rotatably support a shaft 436 which includes oppositely threaded segments 439 and 440 (Figs. 14 and 18). Exteriorly of the member 420, the shaft 436 has secured thereto a small sprocket 441 about which one end of a long chain 442 is trained. An operating handle 443 is removably connected to the squared end of the shaft 436 adjacent the sprocket 441. The chain 442 extends substantially the full length of the unscrambler mechanism 54, and at its other end is trained around a small sprocket 445 of the same diameter as the sprocket 441 (Figs. 4a, 4b, 24, 25, and 26). The sprocket 445 is secured to a shaft 446 which is mounted in a pair of brackets 447, each of which is secured by suitable bolts to the free end of the depending or foot portion of one of the L members 420. The shaft 446 is substantially identical with the shaft 436 and includes corresponding oppositely threaded segments (not shown). The upper and lower reaches of the chain 442 are supported intermediate the ends thereof by adjustable mounted idler sprockets 449 and 450 mounted on the leg portion of the member 420.

A rider nut 455 is mounted on each threaded segment 439 and 440 of the shaft 436, and a rider nut 454 is mounted on the corresponding threaded segments of the shaft 446 (Figs. 14, 35, 38, and 39). An angle bracket 456 is secured to each rider nut 454 and 455 by bolts. A carton flap guide 457 is welded to each of the angle members 456 at its rear and front ends, extending the full length of the unscrambler mechanism 54. Each of the guides 457 is of blunt V cross section, including a vertical wall 458 and an angularly disposed wall 459. As is clear from Figs. 4a, and 4b, each guide 457 includes a horizontally disposed forward portion 460 disposed at a level below the bottle supporting plate 266 and in a position to receive the downwardly depending side flaps 256 of a carton 255 from which the bottles, or the like, are about to be unloaded by gravity. Rearwardly of the section 460 is an inclined section 461 which is followed by a second horizontal section 462. It is manifest that rotation of the crank 443 will effect lateral adjustment of the guides 457 to adapt the same to the size of the particular cartons 255 being handled by the machine 50.

It is to be understood that empty cartons 255 are to be received from the guide 457 by a suitable conveyer, or the like (not shown). For righting cartons 255 as they are moved from the guides 457, there is provided a bail 464 adjustably secured to the free end of the section 462 by a suitable double slot and bolt connection 465 (Figs. 4b and 5b). Empty cartons 255 falling from the guides 457 will strike the bail 464 and be righted upon a receiving conveyer, or the like.

As stated, the construction 415 is vertically adjustable. To the rear end of the stub shaft 425 is removably connected a crank 470, and to the forward end is secured one end of a universal connector 471. A long shaft 472 is secured to the other end of the universal connector 471 and extends forwardly into engagement with a second universal connector 473 (Fig. 24). The universal connector 473 is secured to a stub shaft 474 rotatably mounted in a bracket 479 and to which is splined a worm gear 475. The bracket 479 is bolted to the lower end of the foot of the right hand member 420. The worm gear 475 is in engagement with a worm wheel 476 secured by a setscrew to a shaft 477 rotatably mounted in the brackets 447. The shaft 477 has secured thereto by a setscrew adjacent each rack member 417 a pinion 478 which is in meshing engagement with the respective rack member 417. It is manifest that rotation of the crank 470 will effect vertical movement of the construction 415. A partition retainer plate 485 is secured to the leg portions of the two L members 420 at the discharge end by angle brackets 486 (Figs. 14, 18, and 40). Slots 487 are provided in the plate 485 to permit lateral movement of the members 420. The plate 485 insures the partitions or unit separators remaining in the cartons.

Beneath the conveyer chain 280 is provided a pan 480 which is secured by brackets 481 to the members 295. The pan 480 catches small fragments of glass which may fall through the conveyor chain belt 280. At the discharge end of the conveyer chain belt 280 is a chute 482 riveted to a bracket 483 which is riveted to the member 279. Glass which may be discharged from the rear end of the conveyer chain belt 280 will fall onto the chute 482 and be received by a suitable box, or the like, provided for such purpose.

The electrical system is a simplified one, as is clear from the diagram of Fig. 3. A manual standard starter box 500 is provided which includes the usual start and stop buttons. Also provided is a standard magnetic starter 501 which is connected into the manual starter box 500 by suitable leads 502. Power lines 503 lead into the manual starter 500. Both the motor 355 and the motor 83 continuously operate as long as the machine 50 is in use and are connected by suitable leads 504 and 505, respectively, into the manual starter 500, so that, when the "start" button thereof is pushed, the two motors are energized. The unloader motor 200 is subject to intermittent operation and is connected by leads 506 into the magnetic starter 501. The jam-breaking microswitch 395 comprises one control for operation of the motor 200, and, hence, is connected into the magnetic starter 501 for such functioning by leads 507. The micro-switches 109 and 110 comprise additional controls for operation of the motor 200, and are likewise connected into the magnetic starter 501 by leads 508. Detailed description of the manual starter 500, the magnetic starter 501, and the several connections referred to in conjunction with the description of Fig. 3 is unnecessary in view of the fact that the several parts employed are of standard construction.

*Operation*

As is manifest from the foregoing description taken with the accompanying drawings, the machine 50 is constructed to handle inverted cartons loaded with bottles or other units in upside down position, and is adapted to receive such loaded cartons in upside down position and to successively open the flaps of the cartons, deposit the bottles or the like in right side up positions on a conveyer, and rapidly and efficiently unscramble the bottles, or the like, and present them to a receiving conveyer in a single line. While the bottles, and the like, are being unscrambled, the empty cartons are moved on flap guides to a discharge point where they are dumped onto a receiving conveyer, or the like, right side up for further use.

Specifically, loaded cartons 255 in upside down position are brought to the machine 50 on a conveyer 499, or the like, the bottles or other units being in upside down position in the cartons (Fig. 1). It is to be understood, of course, that power has been turned on through pressing the starter button of the manual starter 509, and, hence, the motors 355 and 83 are in operation. The belt 82 powered by the motor 83 is in continuous operation and receives the cartons 255 which are moved between the guide rails 95 and into contact with the micro-switch arms 112 and 113 to close the micro-switches 109 and 110, thus energizing the motor 200 and initiating movement of the parallel belts 120 and 121. The closing of both switches 109 and 110 is necessary for completing the circuit of the motor 200, since they are in series. The switches 109 and 110 are thus disposed to insure cartons 255 entering the space between the belts 120 and 121 in end to end relation which is essential for proper operation and timing of the machine 50. As the rear end of a carton 255 passes the switch 109, the circuit through the motor 200 is broken, but the inertia of the moving parts is sufficient to move the carton 255 a short distance. The adjusted position of the arm 113 of the switch 110 is such that the rear end of the carton 255 just clears it as it comes to rest. Hence, a delayed succeeding carton 255 will engage both arms 112 and 113 to start the motor 200 just as it abuts the stalled carton 255, insuring end to end feed through the machine 50. The belts 120 and 121 are spaced apart just enough to receive the particular cartons 255 being handled by the machine 50, so that they frictionally engage the sides of the cartons and move them along therebetween. As the cartons 255 leave the belt 82, they are moved onto the hinged plates 261 which permit the side flaps to fall to the preselected positions of the plates 261. Each carton 255 is moved onto the supporting plate 266, and, as the side flaps leave the hinge plates 261, they are deflected into depending vertical positions by the flap opener fingers 268. As the leading end flap of each carton 255 leaves the supporting plate 266, it drops down under the weight of the contained bottles, or the like, and the forward bottles, or the like, drop onto the conveyer chain belt 280. The other bottles follow onto the conveyer chain belt 280 as the carton 255 is moved along and leaves the supporting plate 266. The empty carton 255 is received by the flap guides 457 and is conveyed by pressure from following cartons 255 to the discharge end thereof where it falls onto the bail 464 and is deflected thereby into righted position on a conveyer 498, or the like (Fig. 1).

Bottles, or the like, deposited in upright position on the conveyor chain belt 280 are moved rearwardly thereby until they engage the angularly disposed portion of the moving belt 333 which shunts them onto the conveyor chain belt 281, moving in the opposite direction to the conveyor chain belt 280. The belt 333 insures a positive and efficient movement of the bottles, or the like, from the conveyor chain belt 280 to the conveyor chain belt 281. The conveyer chain belt 281 moves at a predetermined higher rate of speed than the conveyer chain belt 280. Bottles, or the like, received by the conveyer chain belt 281 are shunted by the angularly disposed rail portion 384 onto the conveyer chain belt 283 which is moving at the same, or at a predetermined higher rate of speed and in the opposite direction to the conveyer chain belt 281. The conveyer chain belt 283 receives bottles from the conveyer chain belt 281 one or two at a time so that they are received at the discharge end of the conveyer chain belt 283 in single file which is the desired relationship of such bottles, or the like.

Should bottles or other units jam into the auxiliary fence member 400 in moving from the conveyer chain belt 280 to the conveyer chain belt 281, the pressure will build up, overcome the spring 399, and move the plunger 398 inward to open the switch 395, thus deenergizing the motor 200 and stopping the conveyer belt 280 and the belts 120 and 121. The belt 82 will idle under a carton, not exerting enough force to push cartons through the belts 120 and 121, the conveyer belts 281 and 283 meanwhile continue to move, so that the jam will be rapidly relieved. Pressure against fence member 400 will decrease, the switch 395 will close, and normal operations will resume.

It is understood, of course, that the present machine 50 is normally employed as part of a unit filling line, and that the machine 50 supplies upright bottles, or the like, in single file to conveyers for movement to a succeeding labeling machine, filling machine, or the like. In some installations, the empty cartons are moved to the other end of the filling line where they receive the filled bottles, or the like.

The present machine 50 is adjustable in respect to substantially all of its major components in order to handle cartons and bottles, or the like, of different sizes. The various adjustments may be made quickly and efficiently so that loss of time occasioned by adjustment is reduced to a bare minimum.

The unloader mechanism 52 is vertically adjustable through manipulation of the crank 246 which is advantageous in installing the present machine 50 in a particular filling line and which may be employed to compensate for carton side flaps of different widths. The guide rail 95 and the belts 120 and 121 are laterally adjustable in order to accommodate cartons of different widths. In the unscrambler mechanism 54 the carton flap guides 457 are laterally adjustable to and from each other by manipulation of the crank 443 and are vertically adjustable by manipulation of the crank 470. The effective speed of the motors 200 and 355 may be adjusted by tightening and loosening of the belts 207 and 358, respectively. Adjustments have been provided for the three chain conveyer belts for the height of the plate 315 which supports the belt 333, and for other units and elements, all of which are fully set forth in detail above.

It is manifest that there has been provided a sturdy, fully automatic carton unloading and unit unscrambling machine which fulfills the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention, which is limited only by the claims which follow.

What is claimed is:

1. A machine for unloading cartons and unscrambling unloaded units comprising, in combination, a support, a carton receiving conveyer belt at one end of said support, a first motor for driving said conveyer belt, means operatively connecting said belt and first motor, a pair of opposed vertical endless belts disposed to receive between them and to frictionally engage cartons from said conveyer belt, a second motor for driving said endless belts, means operatively connecting said endless belts and second motor, downwardly sloping members for receiving unsealed side flaps of cartons located parallel with and between said endless belts, a support member between said endless belts for receiving cartons to maintain the end flaps in closed positions, pivoted side flap opening ears between the endless belts and in series with the downwardly sloping members for moving carton side flaps into vertically depending positions, side flap guide members in series with the flap opening ears including channels for receiving the depending edges of vertically depending side flaps to support the cartons, said guide members including ascending portions, a conveyer chain belt below said guide members, and means operatively connecting said conveyer chain belt and second motor, said conveyer chain belt being adapted to receive units from cartons as they are moved from said support member onto said guide members.

2. A machine for unloading cartons and unscrambling unloaded units comprising, in combination, a support, a carton receiving conveyer belt at one end of said support, a first motor for driving said conveyer belt, means operatively connecting said belt and first motor, a pair of opposed vertical endless belts disposed to receive between them and to frictionally engage cartons from said conveyer belt, a second motor for driving said endless belts, means for adjusting said endless belts toward and from each other, means operatively connecting said endless belts and second motor, downwardly sloping members for receiving unsealed side flaps of cartons located parallel with and between said endless belts, a support member between said endless belts for receiving cartons to maintain the end flaps in closed positions, pivoted side flap opening ears between the endless belts and in series with the downwardly sloping members for moving carton side flaps into vertically depending positions, means for simultaneously vertically adjusting said conveyer belt, said endless belt, said sloping members, said support member, and said flap opening ears relative to said support, side flap guide members in series with the flap opening ears including channels for receiving the depending edges of vertically depending side flaps to support the cartons, said guide members including ascending portions, means for vertically adjusting said guide members, a conveyer chain belt below said guide members, and means operatively connecting said conveyer chain belt and second motor, said conveyer chain belt being adapted to receive units from cartons as they are moved from said support member onto said guide members.

3. In a mechanism of the kind described, in combination, a conveyer belt for feeding cartons into said mechanism, means for driving said conveyer belt continuously, co-acting belt conveyors receiving cartons from said conveyer belt and for feeding the same through an unloading zone, a motor for driving said co-acting belt conveyors, means operatively connecting said motor and said co-acting belt conveyors, and a pair of spaced switches mounted adjacent said conveyer belt connected in series and connected into the circuit of said motor, each switch including an arm extending into the path of cartons on said conveyor belt for deflection thereby, said switches being normally open, both switch arms being required to be deflected for energization of said motor, said switch arms being spaced to insure end to end engagement of cartons being handled by said mechanism.

4. In combination, means for feeding cartons through a flap opening zone, conveyer means for receiving units from flap opened cartons, means for driving said first and second mentioned means, a second conveyer means adjacent said first mentioned conveyer means movable in the opposite direction, a third conveyer means adjacent the second conveyer means and movable in the opposite direction, spring biased means at one end of said third conveyer means adapted to be engaged by units upon jamming of units in the vicinity, and emergency control means adjacent said spring biased means connected with said driving means, said last mentioned means being engageable by said spring biased means for actuation to stop the driving action of said driving means.

5. In combination, means for feeding cartons having the supporting flaps unsealed through an unloading zone, means for maintaining the supporting end flaps in closed positions as the cartons are moved through the unloading zone, and means for opening the unsealed initially supporting side flaps to substantially depending position including side flap engaging ears pivotally mounted at one end and spring suspended intermediate the ends, said ears being convergingly directed and being automatically adjustable for cartons of different widths.

6. In combination, carton unloading mechanism including means for feeding through the mechanism cartons disposed on unsealed flaps, means for moving the side flaps into substantially vertically depending positions, including a pair of flap opening ears and means maintaining said ears in diverging relation, side flap guide means for supportingly receiving the free horizontal edges of side flaps as cartons are moved from said first mentioned means, said guide means including spaced troughs having an ascending portion, means for adjusting said troughs toward and away from each other, and means for adjusting said troughs vertically, said flap opening ears being pivotally mounted upon said flap guide means and adjustable therewith.

MORRIS P. NEAL.

References Cited in the file of this patent
UNITED STATES PATENTS

| Number | Name | Date |
|---|---|---|
| 1,302,142 | Donovan | Apr. 29, 1919 |
| 1,480,859 | Harding | Jan. 15, 1924 |
| 1,543,843 | Gwinn | June 30, 1925 |
| 2,226,068 | Mosley | Dec. 24, 1940 |
| 2,315,880 | Stiles | Apr. 6, 1943 |
| 2,323,852 | Seidel | July 6, 1943 |
| 2,353,736 | Le Frank | July 18, 1944 |
| 2,365,007 | Rideout | Dec. 12, 1944 |
| 2,368,020 | Hall | Jan. 23, 1945 |
| 2,389,696 | Stiles | Nov. 27, 1945 |
| 2,467,113 | Deiters | Apr. 12, 1949 |